(12) United States Patent
Coelho et al.

(10) Patent No.: US 11,697,945 B2
(45) Date of Patent: *Jul. 11, 2023

(54) FILTER ASSEMBLY HAVING AN OUTER FILTER ELEMENT AND AN INNER FILTER ELEMENT REMOVABLY INSTALLED WITHIN THE OUTER FILTER ELEMENT

(71) Applicant: Masterspas, LLC, Fort Wayne, IN (US)

(72) Inventors: Nathan Coelho, Leo, IN (US); Michael Davenport, Fort Wayne, IN (US); Richard Medina, Hollis, NY (US); Abhilash Pillai, Westbury, NY (US); Rakshith Asokan, Levittown, NY (US)

(73) Assignee: Masterspas, LLC, Fort Wayne, IN (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/805,505

(22) Filed: Feb. 28, 2020

(65) Prior Publication Data

US 2020/0270888 A1    Aug. 27, 2020

Related U.S. Application Data

(62) Division of application No. 15/791,206, filed on Oct. 23, 2017, now Pat. No. 10,612,258.

(Continued)

(51) Int. Cl.
*E04H 4/12* (2006.01)
*C02F 1/50* (2023.01)
(Continued)

(52) U.S. Cl.
CPC .......... *E04H 4/1209* (2013.01); *B01D 29/21* (2013.01); *B01D 29/58* (2013.01); *B01D 35/306* (2013.01);
(Continued)

(58) Field of Classification Search
CPC .... E04H 4/1209; B01D 29/21; B01D 35/306; B01D 29/58; B01D 2201/291;
(Continued)

(56) References Cited

U.S. PATENT DOCUMENTS

D181,664 S    12/1957  muller et al.
3,347,386 A   10/1967  Kraissl, Jr.
(Continued)

OTHER PUBLICATIONS

Ex Parte Quayle Action Mailed on Apr. 5, 2018 for U.S. Appl. No. 29/581,857.

(Continued)

*Primary Examiner* — Madeline Gonzalez
(74) *Attorney, Agent, or Firm* — Kaplan Breyer Schwarz, LLP

(57) ABSTRACT

A filter assembly for filtering water in spas, swimming pools, hot tubs and whirlpools, having a first or outer filter element, a second or inner filter element removably installed within the outer filter element, a first coupling member associated with the outer filter element, a second coupling member associated with the inner filter element, the first and second coupling members engaging one another to connect the inner filter element with the outer filter element, and a releasable detent arrangement resisting disengagement of the first and second coupling members from one another. The outer filter element includes a filter medium for mechanically removing particulates from a fluid to be treated and the inner filter element includes a filter medium containing fluid purifying particles.

13 Claims, 22 Drawing Sheets

Related U.S. Application Data

(60) Provisional application No. 62/411,600, filed on Oct. 22, 2016.

(51) Int. Cl.
    *B01D 35/30*    (2006.01)
    *B01D 29/58*    (2006.01)
    *C02F 1/00*    (2023.01)
    *B01D 29/21*    (2006.01)
    *C02F 103/42*    (2006.01)

(52) U.S. Cl.
    CPC .............. *C02F 1/001* (2013.01); *C02F 1/505* (2013.01); *B01D 2201/291* (2013.01); *B01D 2201/4038* (2013.01); *C02F 2103/42* (2013.01); *C02F 2201/006* (2013.01)

(58) Field of Classification Search
    CPC .. B01D 2201/4038; C02F 1/001; C02F 1/505; C02F 2201/006; C02F 2103/42
    USPC .. 210/167.1, 167.12, 167.16, 315, 338, 342, 210/450, 493.2, 470, 238
    See application file for complete search history.

(56) References Cited

U.S. PATENT DOCUMENTS

| | | | |
|---|---|---|---|
| 3,348,689 A * | 10/1967 | Kraissl, Jr. | ............. B01D 29/33 210/315 |
| D246,109 S | 10/1977 | Rosaen | |
| D294,167 S | 2/1988 | Meissner | |
| D305,199 S | 12/1989 | Jackson | |
| D306,199 S | 2/1990 | Meissner | |
| D306,640 S | 3/1990 | Kott | |
| D318,091 S | 7/1991 | Sherman | |
| D318,094 S | 7/1991 | Sherman | |
| D320,062 S | 9/1991 | Meissner | |
| 5,135,654 A | 8/1992 | Heskett | |
| 5,198,118 A | 3/1993 | Heskett | |
| 5,211,846 A | 5/1993 | Kott et al. | |
| 5,314,623 A * | 5/1994 | Heskett | ................... C02F 1/281 210/638 |
| D402,735 S | 12/1998 | Kott | |
| D403,740 S | 1/1999 | Kott | |
| D412,551 S | 8/1999 | Smith et al. | |
| D414,544 S | 9/1999 | Ward et al. | |
| D470,216 S | 2/2003 | Gustafson et al. | |
| D475,129 S | 5/2003 | Ward et al. | |
| 6,962,660 B2 | 11/2005 | Wybo | |
| D521,137 S | 5/2006 | Khalil | |
| D548,307 S | 8/2007 | Reynolds et al. | |
| D560,751 S | 1/2008 | Miller | |
| 7,416,663 B2 | 8/2008 | Kott et al. | |
| D612,258 S | 3/2010 | Rica | |
| 7,874,431 B2 | 1/2011 | Eisengraeber-Pabst et al. | |
| D648,822 S | 11/2011 | Salvador et al. | |
| D656,577 S | 3/2012 | Salvador et al. | |
| D717,395 S | 11/2014 | Neto | |
| D717,420 S | 11/2014 | Von Seggern | |
| D726,869 S | 4/2015 | Lepine et al. | |
| D729,344 S | 5/2015 | Colussi | |
| D730,731 S | 6/2015 | Bewley et al. | |
| D735,293 S | 7/2015 | Schwartz et al. | |
| D751,170 S | 3/2016 | Ruprecht | |
| D753,739 S | 4/2016 | Bell | |
| D753,789 S | 4/2016 | Raab et al. | |
| D754,304 S | 4/2016 | Morris et al. | |
| D770,011 S | 10/2016 | Nelson | |
| D770,592 S | 11/2016 | Schwartz et al. | |
| D773,014 S | 11/2016 | Pale | |
| D782,000 S | 3/2017 | Morris et al. | |
| D793,525 S | 8/2017 | Morris et al. | |
| D810,232 S | 2/2018 | Schwartz et al. | |
| D810,859 S | 2/2018 | Lu et al. | |
| D825,029 S | 8/2018 | Goldman | |
| D827,086 S | 8/2018 | Bell et al. | |
| D835,233 S | 12/2018 | Coelho et al. | |
| D844,103 S | 3/2019 | Yoshita | |
| D852,319 S | 6/2019 | Hellman et al. | |
| D854,650 S | 7/2019 | Hellman et al. | |
| D855,755 S | 8/2019 | Coelho et al. | |
| D880,656 S | 4/2020 | Coelho et al. | |
| D881,339 S | 4/2020 | Coelho et al. | |
| D882,038 S | 4/2020 | Loepfe | |
| 10,612,258 B2 * | 4/2020 | Coelho | ................ B01D 35/306 |
| 2004/0124129 A1 | 7/2004 | Booth | |
| 2007/0241045 A1 | 10/2007 | Kott et al. | |
| 2010/0243554 A1 * | 9/2010 | Herrin | .................. B01D 29/232 210/457 |
| 2011/0147297 A1 | 6/2011 | Core et al. | |
| 2011/0168647 A1 | 7/2011 | Wieczorek et al. | |
| 2012/0080372 A1 | 4/2012 | Ries et al. | |
| 2014/0021119 A1 * | 1/2014 | Malgorn | .............. B01D 29/908 210/232 |
| 2017/0028326 A1 | 2/2017 | Till et al. | |
| 2017/0326482 A1 | 11/2017 | Prchal et al. | |
| 2018/0028950 A1 | 2/2018 | Heilman et al. | |
| 2018/0112429 A1 | 4/2018 | Coelho et al. | |
| 2018/0117517 A1 | 5/2018 | Tanaka | |
| 2018/0264382 A1 | 9/2018 | Dani et al. | |
| 2019/0054410 A1 | 2/2019 | Tanaka | |

OTHER PUBLICATIONS

Ex Parte Quayle Action received for U.S. Appl. No. 29/668,463, mailed on Aug. 20, 2019.
"Restriction Office Action" dated Dec. 27, 2017 in Design U.S. Appl. No. 29/581,857.
Final Rejection received for U.S. Appl. No. 15/791,206, dated Apr. 24, 2019, 12 pages.
Nathan Coelho et al., Related unpublished Design U.S. Appl. No. 29/581,857, filed Oct. 22, 2016.
Nathan Coelho et al., Unpublished US application filed on Oct. 30, 2018, U.S. Appl. No. 29/668,463.
Nathan Coelho et al., Unpublished US patent application filed on Oct. 30, 2018, U.S. Appl. No. 29/668,453.
Non-Final Rejection received for U.S. Appl. No. 15/791,206, dated Nov. 26, 2018, 12 pages.
Notice of Allowance and Fees Due (PTOL-85) dated Aug. 3, 2018 for U.S. Appl. No. 29/581,857.
Notice of Allowance and Fees Due (PTOL-85) dated Aug. 7, 2020 for U.S. Appl. No. 29/725,920.
Notice of Allowance and Fees Due (PTOL-85) dated Jul. 18, 2018 for U.S. Appl. No. 29/581,857.
Notice of Allowance and Fees Due (PTOL-85) received for U.S. Appl. No. 29/668,453, dated Mar. 7, 2019, 7 pages.
Notice of Allowance received for U.S. Appl. No. 15/791,206, dated Aug. 6, 2019, 10 pages.
Notice of Allowance received for U.S. Appl. No. 15/791,206, dated Nov. 18, 2019, 9 pages.
Notice of Allowance received for U.S. Appl. No. 29/581,857, dated Aug. 3, 2018.
Notice of Allowance received for U.S. Appl. No. 29/668,463, dated Nov. 27, 2019.
Notice of Allowance received for U.S. Appl. No. 29/700,712, dated Dec. 11, 2019.
Requirement for Restriction/Election dated Dec. 27, 2017 for U.S. Appl. No. 29/581,857.
Requirement for Restriction/Election received for U.S. Appl. No. 29/668,463, dated Apr. 26, 2019 6 pages.
Notice of Allowance and Fees Due (PTOL-85) dated Mar. 15, 2021 for U.S. Appl. No. 29/731,356.
Notice of Allowance and Fees Due (PTOL-85) dated Nov. 23, 2020 for U.S. Appl. No. 29/731,356.

\* cited by examiner

FILTER ASSEMBLY HAVING AN OUTER FILTER ELEMENT AND AN INNER FILTER ELEMENT REMOVABLY INSTALLED WITHIN THE OUTER FILTER ELEMENT

RELATED APPLICATIONS

This application is a divisional of co-pending U.S. application Ser. No. 15/791,206, filed on Oct. 23, 2017, which claims the benefit of U.S. Provisional Application No. 62/411,600, filed Oct. 22, 2016, the entire disclosures of which are incorporated herein by reference.

FIELD

This invention relates to fluid filters and filter systems. More particularly. This invention relates to filters and filter systems for filtering water in spas, swimming pools, hot tubs and whirlpools.

BACKGROUND

Particulate filters, such as sand beds, are used in filter systems of swimming pools, spas, hot tubs and whirlpools, to trap and remove particulate contaminants from the water. Chlorine is used in these filter systems to kill harmful bacteria, algae and fungus that typically infect the water.

The particulate filter must be periodically back-flushed to clear it of accumulated debris, often requiring that the filter system be taken down for a period of time during the back-flushing. The chlorine used to kill harmful bacteria, algae and fungus in the water causes a strong chlorine odor to permeate the area around the pool or spa. This odor becomes especially objectionable when the spa or pool is located indoors, because the odor becomes concentrated and the area must be ventilated to keep the chlorine odors down. The chlorine also attacks certain plastics and fibers, causing deterioration and bleaching of pool or spa accessories, as well as swimming or spa apparel. In addition, users of the pool or spa must shower or bathe to remove the chlorine after using the pool or spa.

Accordingly, a need exists for a filter that allows the use of chlorine to be substantially reduced or eliminated, to maintain safe, filtered water, free of harmful bacteria in spas or pools and that does not require extensive maintenance, such as back-flushing.

SUMMARY

Disclosed herein is a filter assembly for filtering water in, for example, spas and swimming pools. The filter assembly comprises a first filter element, a second filter element removably installed within the first filter element, a first coupling member associated with the first filter element, a second coupling member associated with the second filter element, the first and second coupling members engaging one another to connect the second filter element with the first filter element, and a releasable detent arrangement resisting disengagement of the first and second coupling members from one another.

In some embodiments, the first and second coupling members rotatably engage one another. In some embodiments, the engagement or the disengagement of the first and second coupling members requires less than or more than 360 degrees of rotation and typically about 90 degrees of rotation.

In some embodiments, the first and second coupling members include one of: a continuous thread or a thread segment on one of the first and second filter elements and a corresponding continuous thread or a corresponding thread segment on the other one of the first and second filter elements; a continuous thread or a thread segment on one of the first and second filter elements and a corresponding continuous groove or a corresponding segment on the other one of the first and second filter elements; and a lug on one of the first and second filter elements and a corresponding groove or a corresponding groove segment on the other one of the first and second filter elements.

In some embodiments, the releasable detent arrangement includes a first detent member associated with the first filter element and a second detent member associated with the second filter element.

In some embodiments, the first detent member includes one of an indentation and a bump provided on a pedestal disposed on an end cap of the first filter element, wherein the second detent member includes the other one of the indentation and the bump provided on an abutment surface of a handle of the second filter element, and wherein the releasable detent arrangement resists the disengagement of the first and second coupling members from one another when the bump is disposed in the indentation. In some embodiments, the releasable detent arrangement releases when a rotational torque applied to one of the first and second filter elements is sufficient to cause the bump to move out of the indentation.

In some embodiments, the second filter element includes a filter medium comprising a fluid purifying particles. In some embodiments, the fluid purifying particles are formed of an alloy of copper and zinc.

In some embodiments, the second filter element further includes a handle structure and a filter medium depending from the handle structure. In some embodiments, the handle structure includes a closure member and a handle member extending from the closure member, the closure member including the second coupling member. In some embodiments, the closure member includes a skirt having an annular circumferential surface and wherein the second coupling member includes one of: a continuous thread or a thread segment provided on the circumferential surface of the skirt; a continuous groove or a groove segment provided in the circumferential surface of the skirt; and a lug provided on the circumferential surface of the skirt.

In some embodiments, the first filter element further includes a filter medium for mechanically removing particulates from a fluid to be treated. In some embodiments, the first filter element further includes an upper end cap and a lower end cap, the filter medium disposed between the upper and lower end caps, the upper end cap including an opening for removably inserting the second filter element within the first filter element.

In some embodiments, the first filter element further includes an end cap having an opening for removably inserting the second filter element within the first filter element, the opening having a surface which includes the first coupling member, the first coupling member including one of a continuous thread or a thread segment, a continuous groove or a groove segment, and a lug.

In some embodiments, the first filter element further includes an end cap having an opening for removably inserting the second filter element within the first filter element, the first coupling member disposed within the opening of the end cap.

In some embodiments, the first coupling member comprises a filter lock insert having an annular circumferential surface, the filter lock insert including one of: a continuous thread or a thread segment provided on the circumferential surface of the filter lock insert; a continuous groove or groove segment provided in the circumferential surface of the filter lock insert; and a lug provide on the circumferential surface of the filter lock insert.

In some embodiments, the first filter element includes an end cap having an opening for removably attaching the first filter element to a filter system.

In some embodiments, the first filter element includes an end cap having an opening and a connector disposed within the opening for removably attaching the first filter element to a filter system.

Further disclosed herein is a filter element for a filter assembly comprising a coupling member for engaging a corresponding coupling member of a second filter element of the filter assembly, to connect the filter element with the second filter element when the second filter element is removably installed within the filter element. The coupling member includes one of: a continuous thread or a thread segment; a continuous groove or a groove segment; and a lug; and a detent member for resisting disengagement of the coupling member from the corresponding coupling member of the second filter element when the second filter element is installed within the filter element.

Still further disclosed herein is a filter element for a filter assembly comprising a coupling member for engaging a corresponding coupling member of a second filter element of the filter assembly, to connect the filter element with the second filter element when the filter element is removably installed within the second filter element. The coupling member includes one of: a continuous thread or a thread segment; a continuous groove or a groove segment; and a lug; and a detent member for resisting disengagement of the coupling member from the corresponding coupling member of the second filter element when the filter element is installed within the second filter element.

BRIEF DESCRIPTION OF THE DRAWING

The disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and the drawing.

DETAILED DESCRIPTION

Figure 1A:
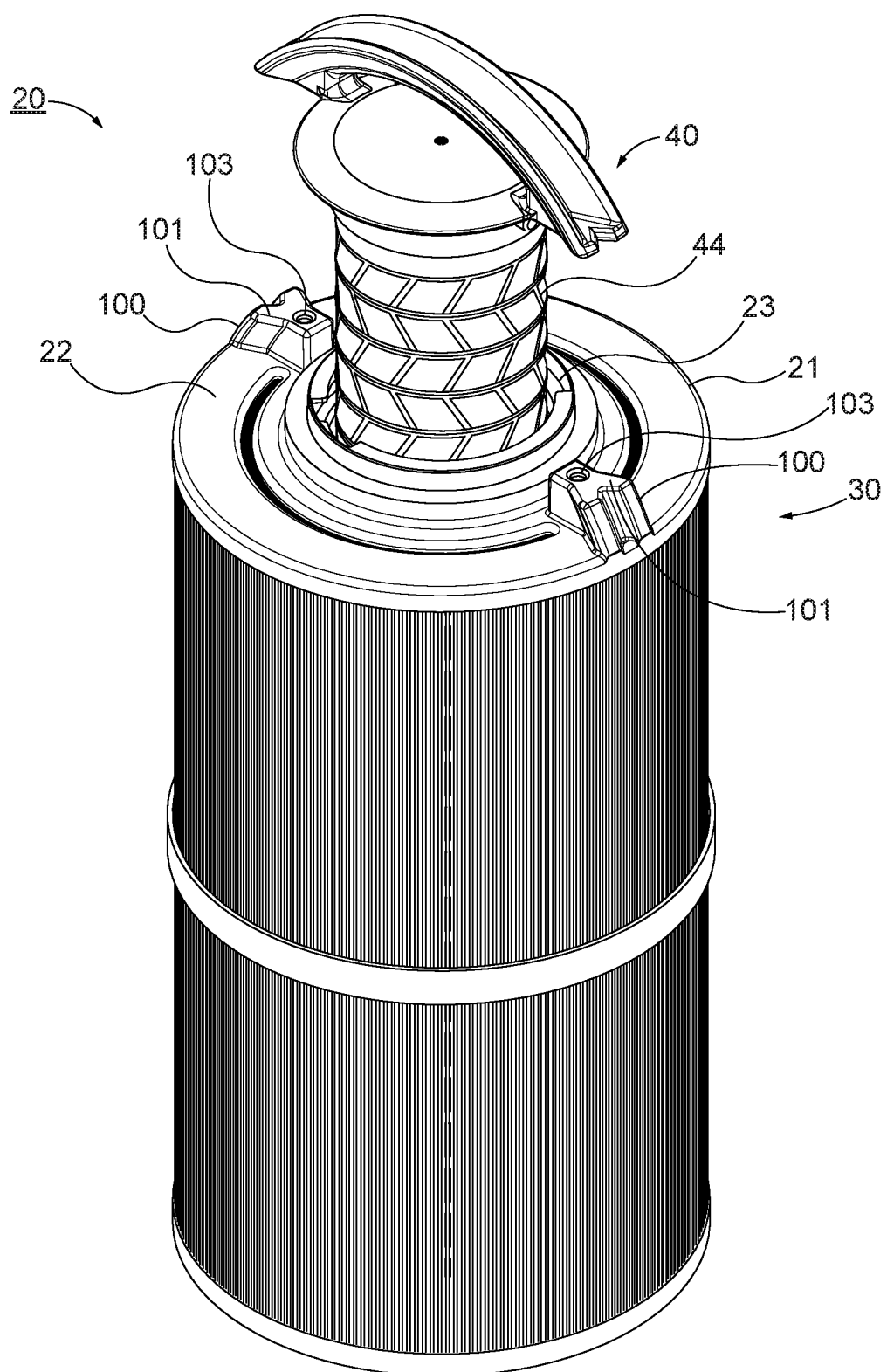
FIG. 1A is a top isometric view of a filter assembly according to an embodiment of the invention comprising a first or outer filter element and a removable second or inner filter element shown being removed or inserted into the outer filter element.
Figure 1B:
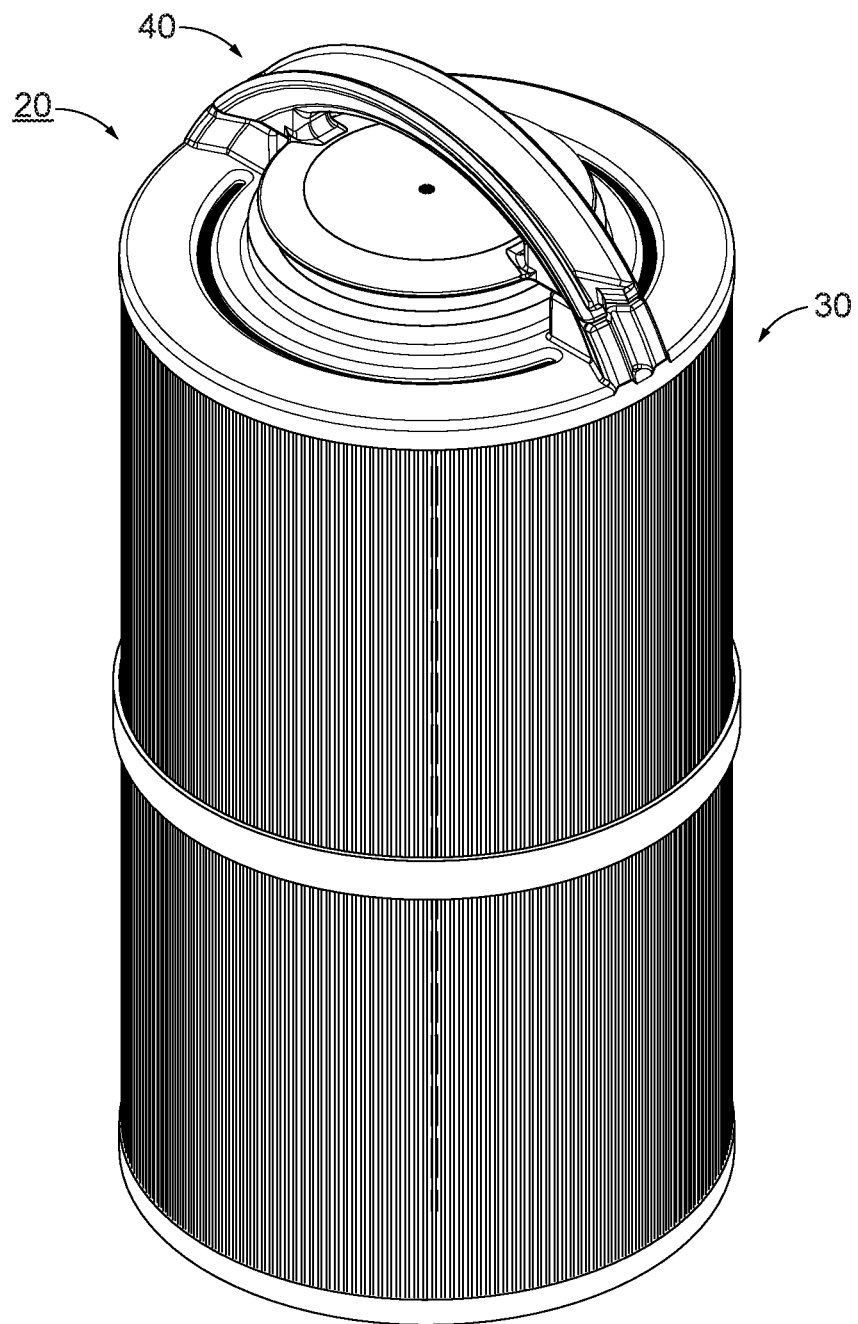
FIG. 1B is a top isometric view of the filter assembly of FIG. 1A, wherein the inner filter element is shown installed within the outer filter element and coupled therewith.
Figure 1C:
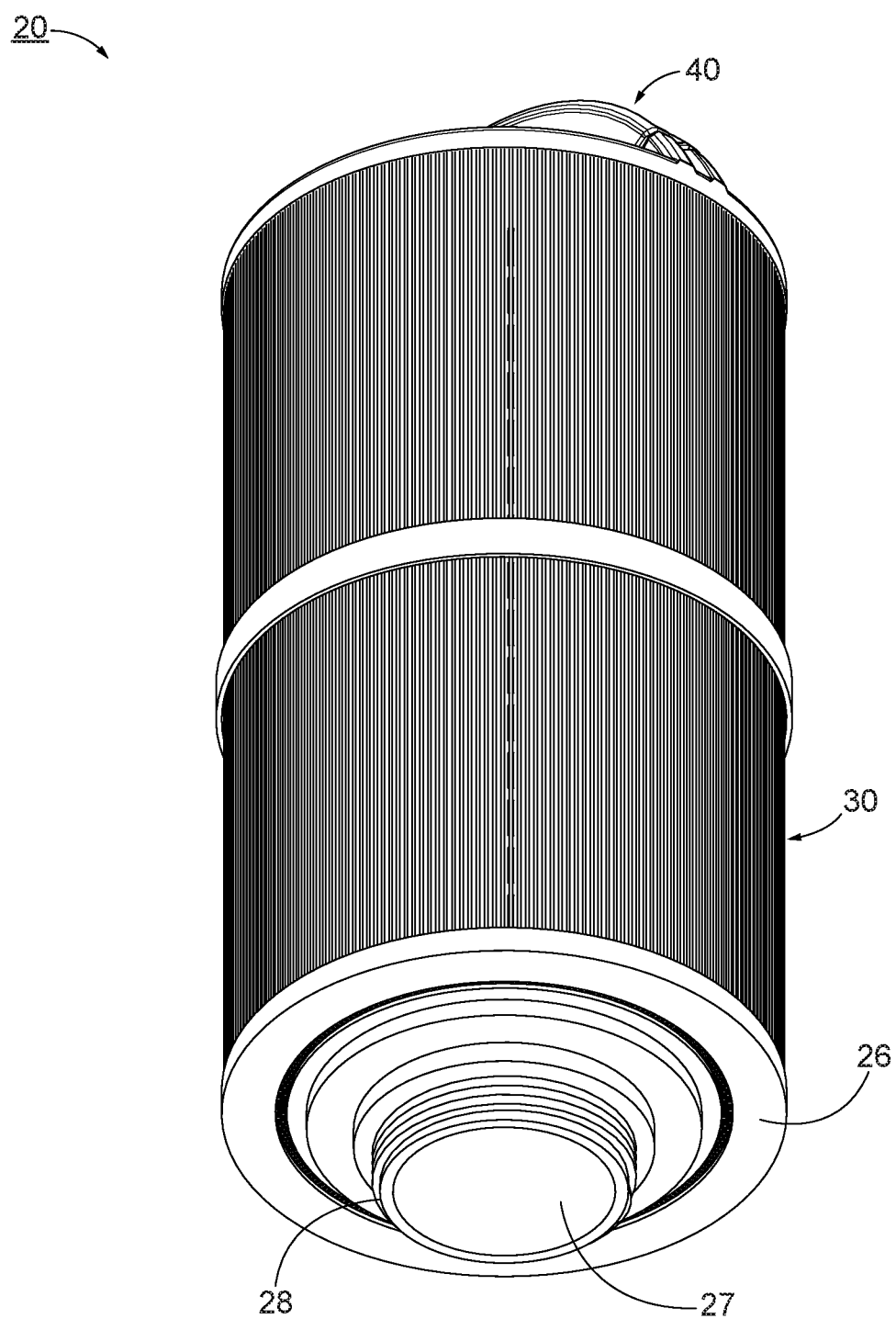
FIG. 1C is a bottom isometric view of the filter assembly.

FIGS. 1A-1C collectively illustrate an embodiment of a filter assembly 20 according to the invention. As illustrated in FIGS. 1A and 1B, the filter assembly 20 includes a first or outer filter element 30 and a removable second or inner filter element 40. The filter assembly 20 can have a round cylindrical configuration, as shown in FIGS. 1A-1C, or any other suitable configuration. The outer filter element 30 is constructed to operate as a micro filter for mechanically removing particulates from a fluid to be treated. The inner filter element 40 constructed to operate as a fluid purifying filter for electrochemically changing the fluid chemistry and creating an environment that is deadly to some microorganisms and which interferes with the ability of many microorganisms to reproduce. The filter assembly 20 is intended, without limitation, for filtering water in spas, swimming pools, hot tubs, and whirlpools. For example, the filter assembly 20 can be used in a filter system for a spa and/or swimming pool, such as disclosed in U.S. Pat. No. 6,962,660 to Wybo, the disclosure of which is incorporated herein by reference. One of ordinary skill in the art will of course appreciate that the filter assembly 20 can also be used for filtering water and other fluids in other applications.

Figure 2A:
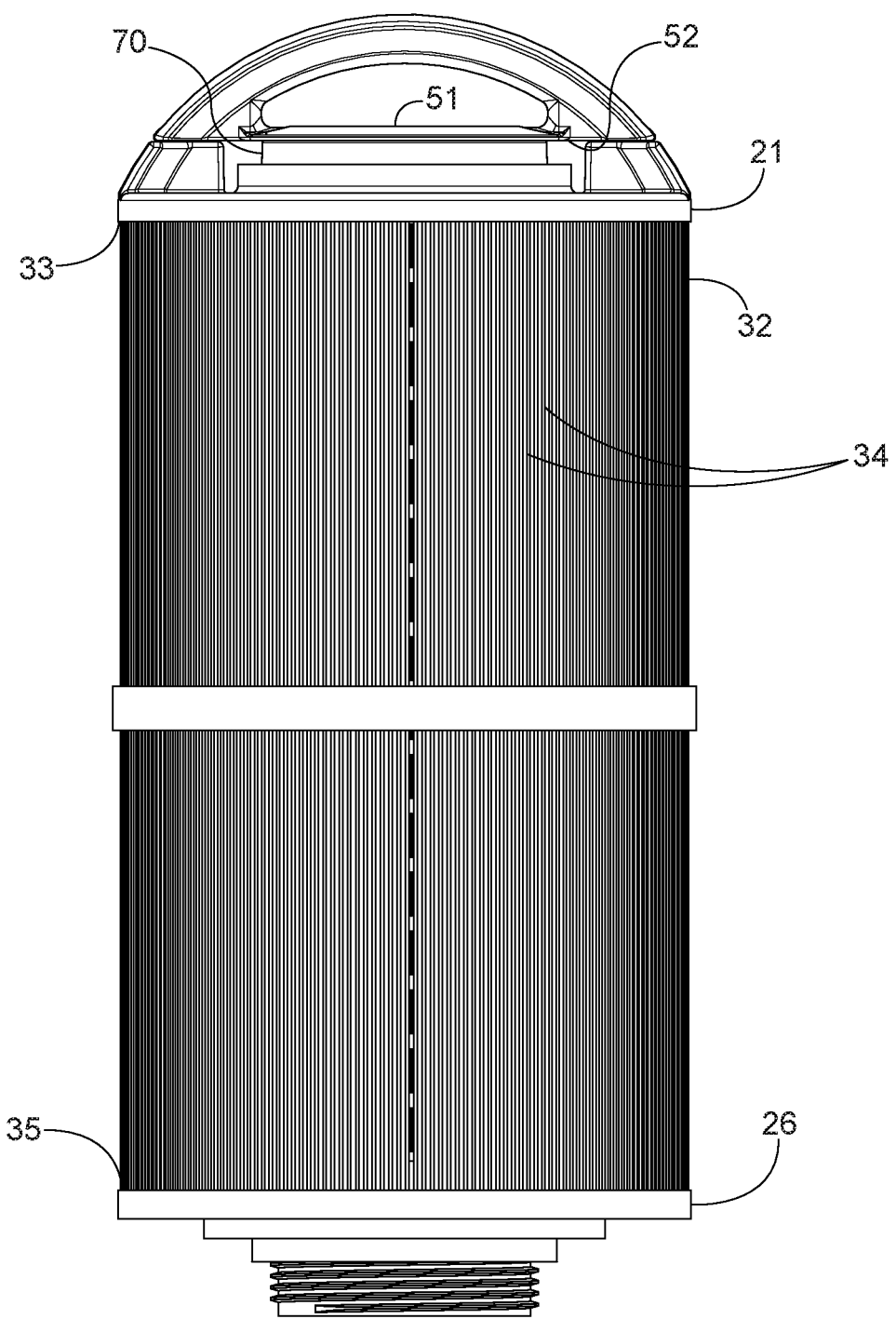
FIG. 2A is a front or rear elevational view of the filter assembly.
Figure 3A:
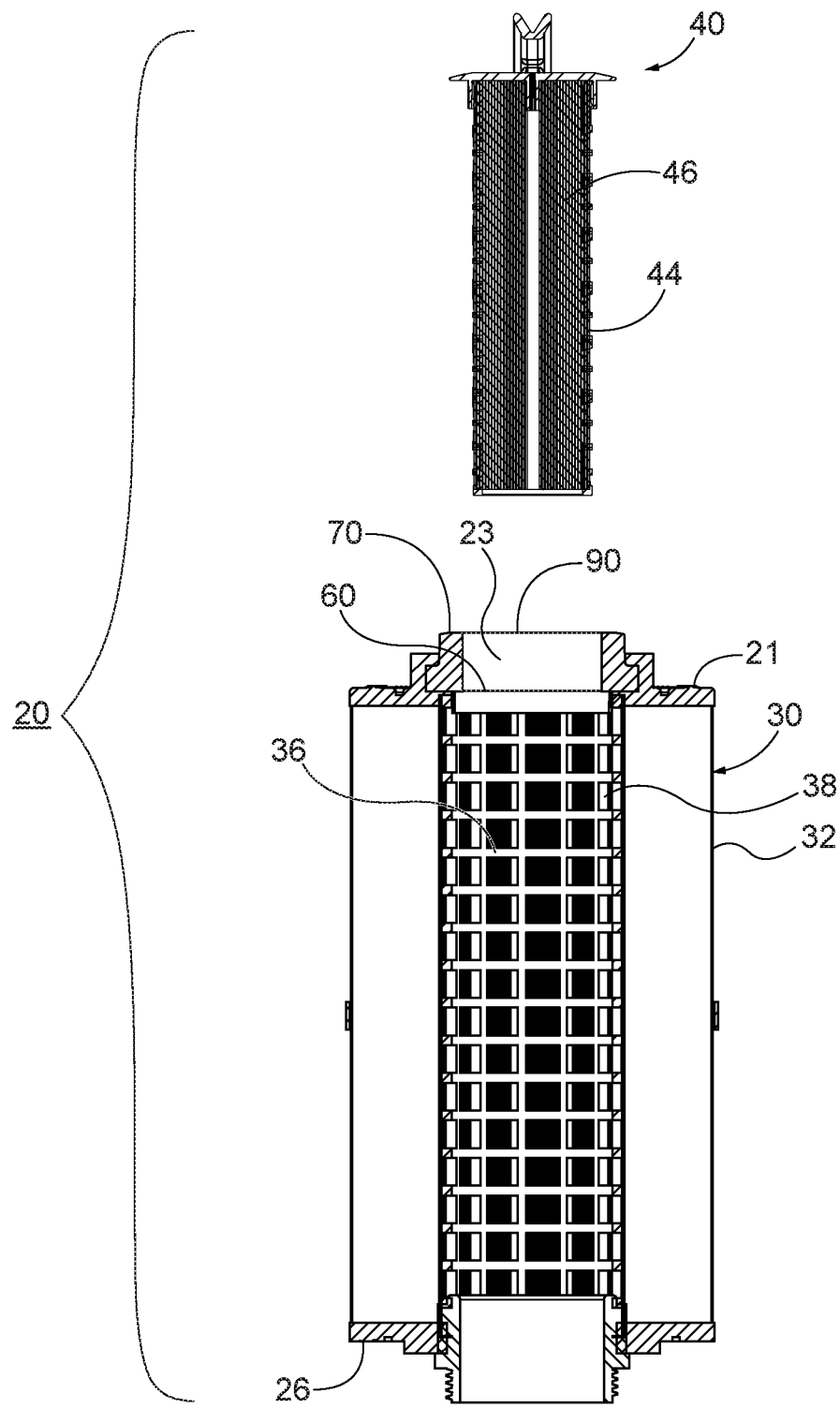
FIG. 3A is an exploded cross-sectional view of the filter assembly.
Figure 3B:
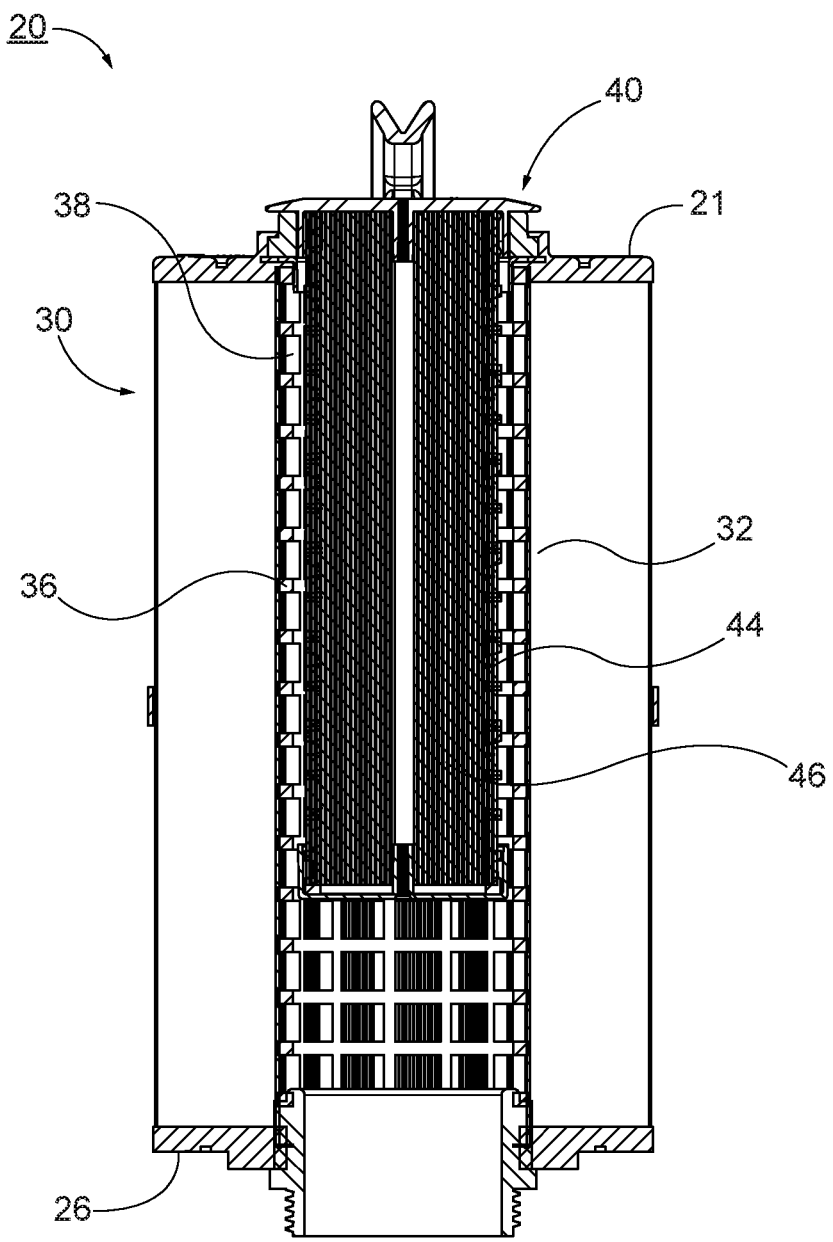
FIG. 3B is an assembled cross-sectional view of the filter assembly.

Referring to FIG. 2A, the outer filter element 30 comprises a porous filter medium or membrane 32, which is configured to define an interior space 38 (FIG. 3A) for receiving a core 44 containing a filter medium 46 of the inner filter 40 (FIG. 3B). The porous filter membrane 32 can be made of a fibrous material, such as polyester fibers (for example woven or as a non-woven felt), and can be folded into a plurality of pleats 34 extending lengthwise along the filter assembly 20. The pleats 34 provide increased surface area for filtering and extend the life of the filter. The porous filter membrane 32 can have a porosity which is selected to trap particles as small as 20 microns in size.

Figure 2B:
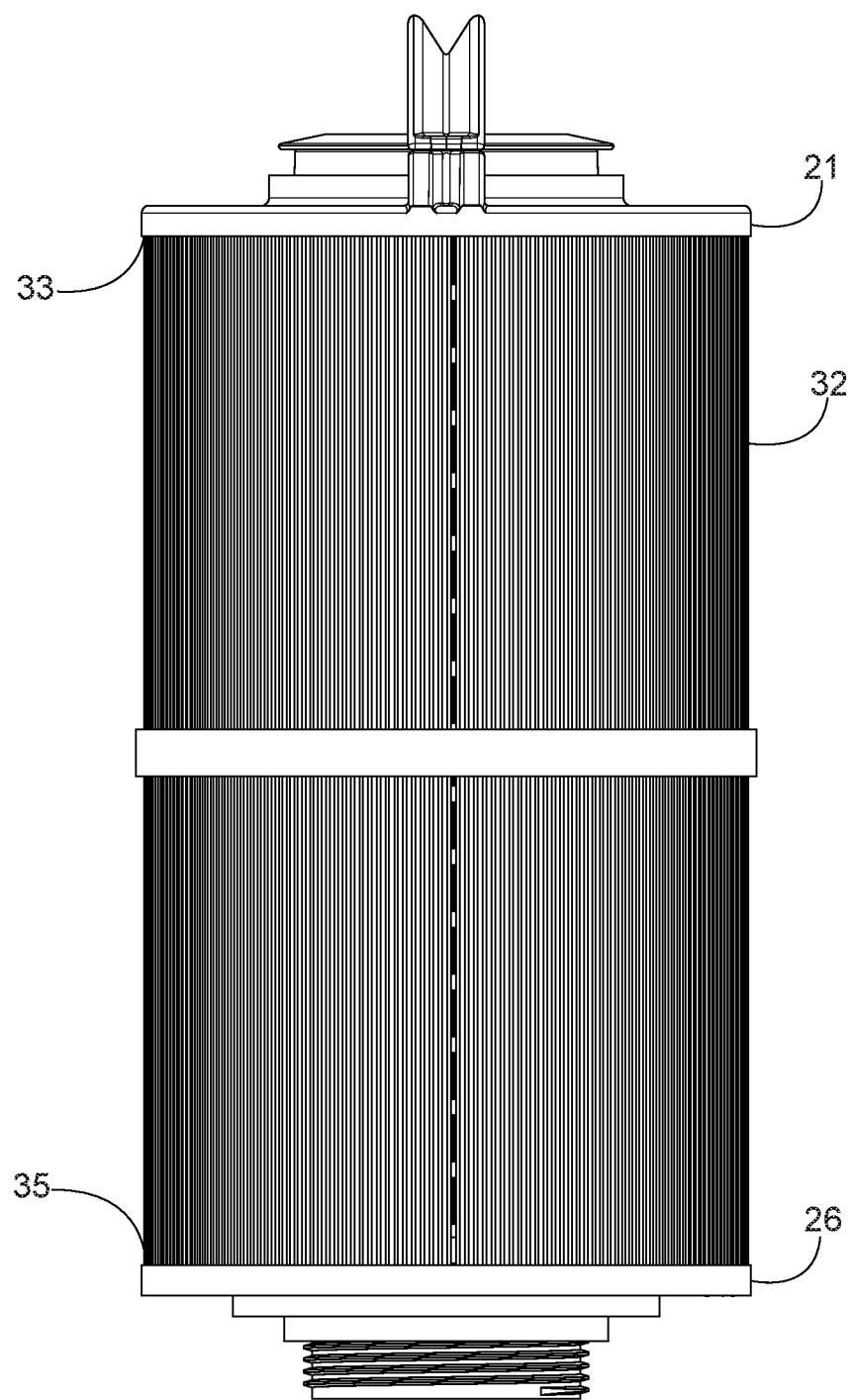
FIG. 2B is a left or right elevational view of the filter assembly.

As illustrated in, for example, in FIGS. 2A and 2B, the porous filter membrane 32 is disposed between non-porous upper and lower end caps 21 and 26, respectively. The end caps 21 and 26 can be formed from a polymer resin, such as polyurethane, and upper and lower ends 33 and 35, respectively, of the porous filter membrane 32 can be attached and sealed to the end caps 21 and 26, respectively, by embedding them into the resin. This ensures a fluid tight joint between the porous filter membrane 32 and the end caps 21 and 26 in order to define a flow path through the porous filter membrane 32, wherein all of the unfiltered fluid passes through the porous filter membrane 32, thereby preventing any bypass of unfiltered fluid at the junctions of ends 33 and 35 of the porous filter membrane 32 and the end caps 21 and 26, respectively.

Referring to FIGS. 3A and 3B, a perforated support tube or core 36 is positioned immediately adjacent to or against the inner side of the porous filter membrane 32 and surrounds the interior space 38. The core 36 can be attached at its ends to the end caps 21 and 26. The core 36 radially supports the porous filter membrane 32 and maintains the end caps 21 and 26 in spaced relation at either end of the outer filter element 30.

As best illustrated in FIGS. 1A, 3A, and 3B, the upper end cap 21 of the outer filter element 30 has a central opening 23, which allows the core 44 containing the filter medium 46 of the inner filter 40 to be inserted into the interior space 38 defined by the porous filter membrane 32 of the outer filter element 30.

Figure 4A:
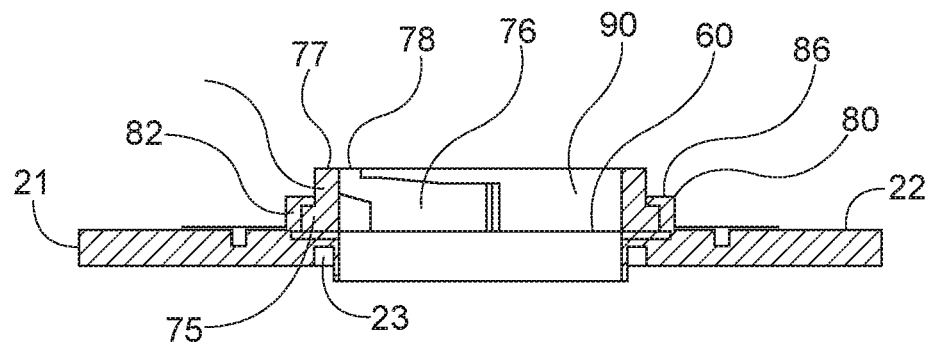
FIG. 4A is a left or right elevational cross-sectional view of an upper end cap of the outer filter element of the filter assembly according to an embodiment of the invention.
Figure 4B:
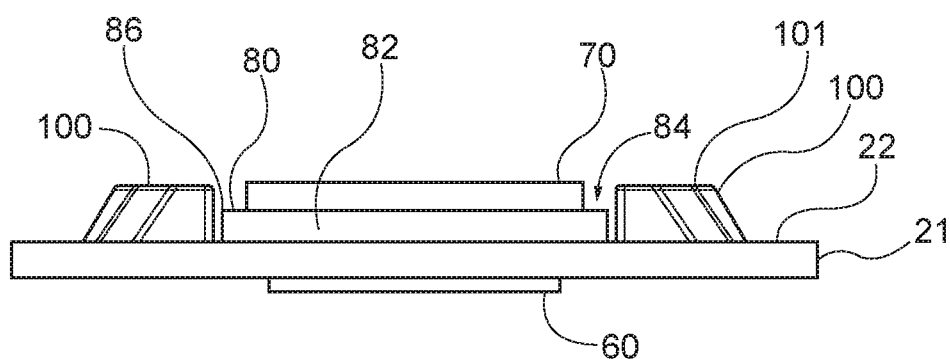
FIG. 4B is a front or rear elevational view of the upper end cap of the outer filter element of the filter assembly.
Figure 4C:
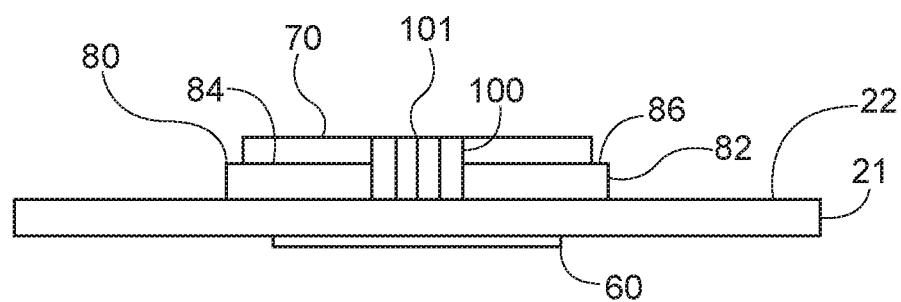
FIG. 4C is a left or right elevational view of the upper end cap of the outer filter element of the filter assembly.
Figure 5A:
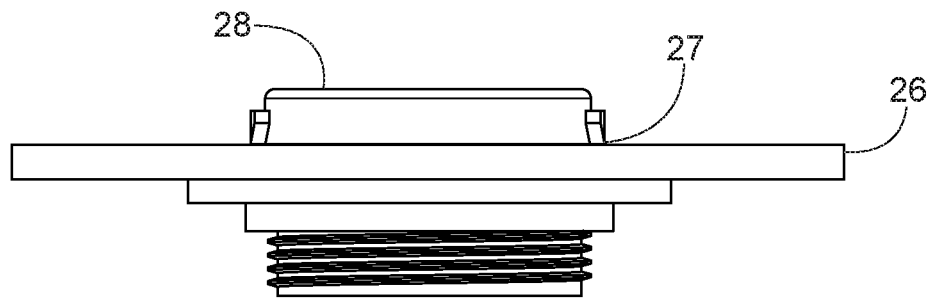
FIG. 5A is a front or rear elevational view of a lower end cap of the outer filter element of the filter assembly according to an embodiment of the invention.
Figure 5B:
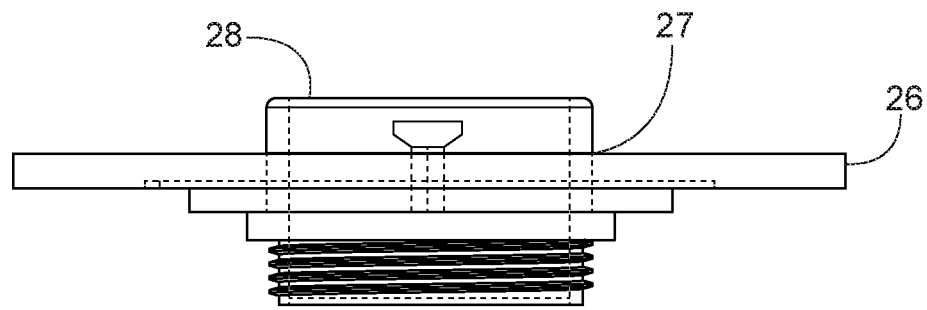
FIG. 5B is a left or right elevational view of the lower end cap of the outer filter element of the filter assembly.
Figure 5C:
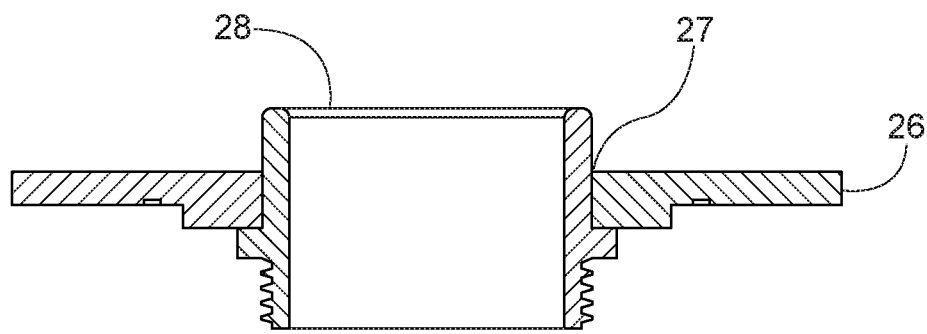
FIG. 5C is an elevational cross-sectional view of the lower end cap of the outer filter element of the filter assembly.
Figure 5D:
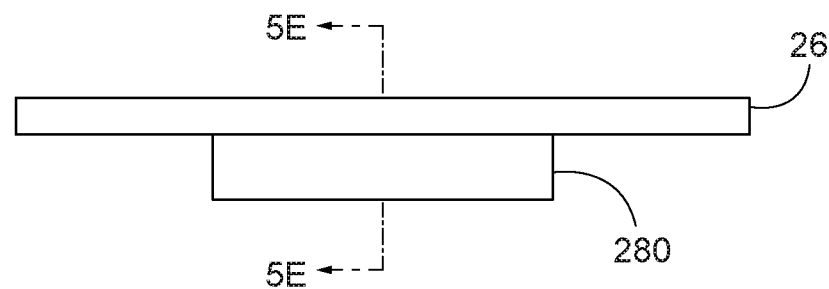
FIG. 5D is an elevational view of the lower end cap of the outer filter element of the filter assembly according to another embodiment of the invention.
Figure 5E:
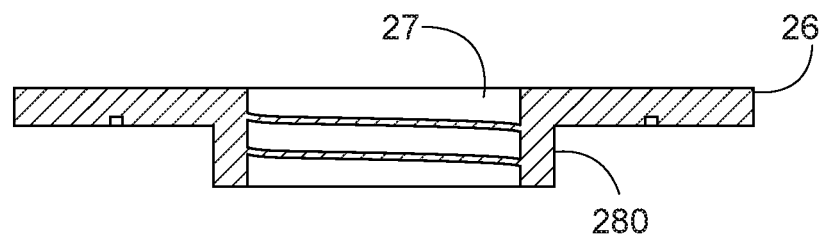
FIG. 5E is an elevational cross-sectional view through line 5E-5E of FIG. 5D.
Figure 6A:
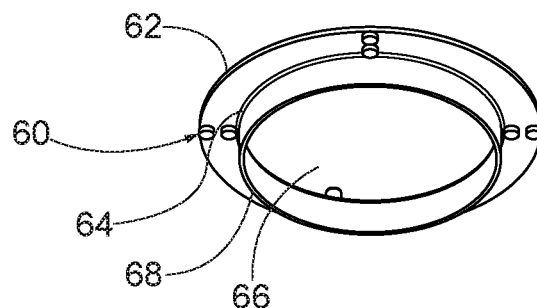
FIG. 6A is a bottom isometric view of a filter washer associated with the upper end cap of the outer filter element of the filter assembly according to an embodiment of the invention.
Figure 6B:
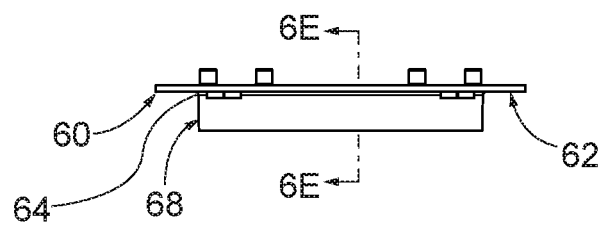
FIG. 6B is an elevational view of the filter washer.
Figure 6C:
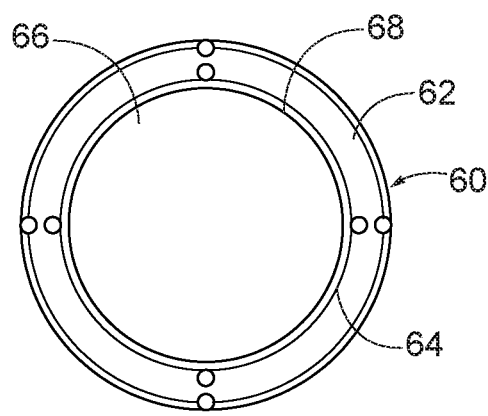
FIG. 6C is a bottom plan view of the filter washer.
Figure 6D:
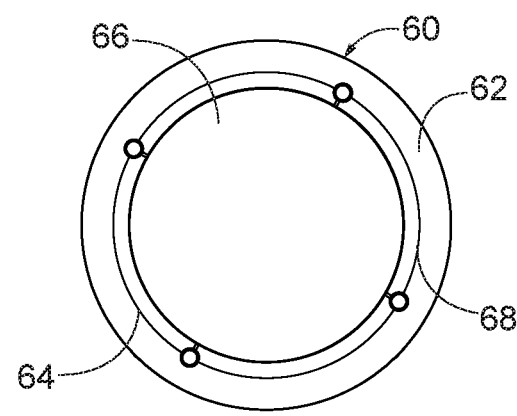
FIG. 6D is a top plan view of the filter washer.
Figure 6E:
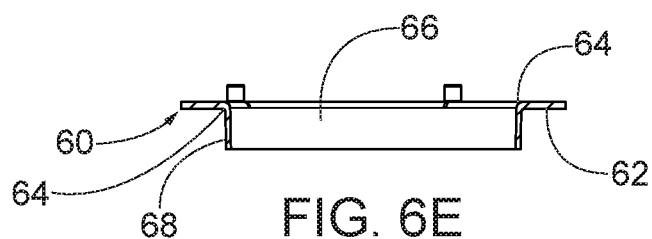
FIG. 6E is an elevational cross-sectional view through line 6E-6E of FIG. 6B.

Referring now to FIGS. 4A-4C, the upper end cap 21 of the outer filter element 30 includes a filter washer 60 seated in the central opening 23, a filter lock insert 70 seated on the filter washer 60, and an insert retaining collar 80 extending up from an top surface 22 of the end cap 21 for retaining the filter washer 60 and the filter lock insert 70 to the upper end cap 21.

As illustrated in FIGS. 1A, 4B and 4C, the top surface 22 of the outer filter element end cap 21 includes two pedestals 100 which are disposed opposite to one another. One or both pedestals 100 include detent locking member or elements 103 (e.g., indentations) of a detent arrangement, which are provided in or on upper surfaces 101 of the pedestals 100.

Referring to FIGS. 6A-6E, the filter washer 60 includes an annular portion 62 and a collar portion 68 depending from an inner circumferential edge 64 of the annular portion 62. The filter washer 60 defines an opening 66. When the filter washer 60 is seated in the central opening 23 of the upper end cap 21, the collar portion 68 extends through the central opening 23 and the annular portion 62 lies on the top surface 22 of the end cap 21, as illustrated in FIG. 4A.

Figure 7A:
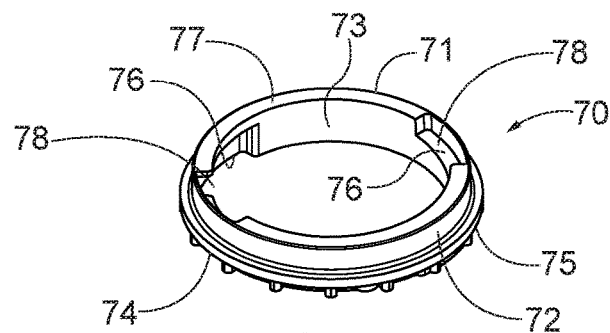
FIG. 7A is a top isometric view of a filter lock insert associated with the upper end cap of the outer filter element of the filter assembly according to an embodiment of the invention.
Figure 7B:
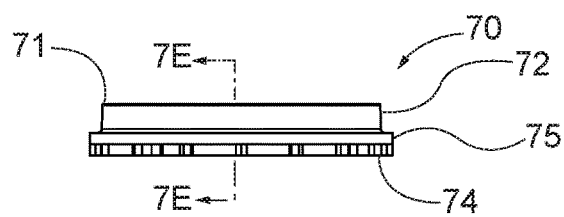
FIG. 7B is an elevational view of the filter lock insert.
Figure 7C:
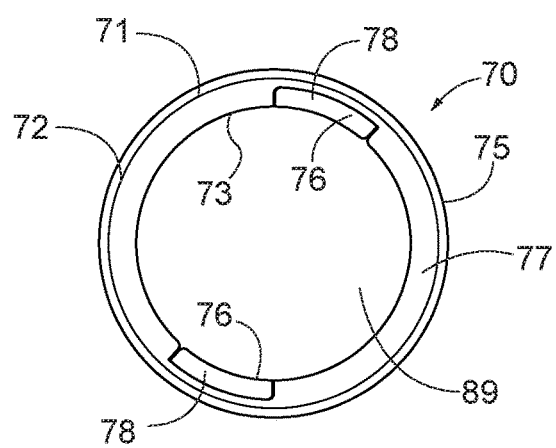
FIG. 7C is a top plan view of the filter lock insert.
Figure 7D:
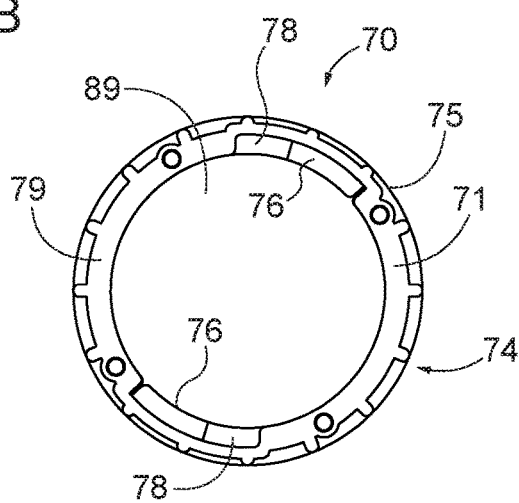
FIG. 7D is a bottom plan view of the filter lock insert.
Figure 7E:
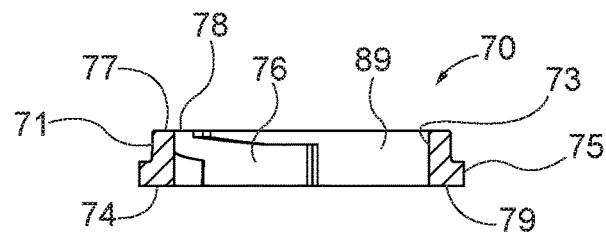
FIG. 7E is an elevational cross-sectional view through line 7E-7E of FIG. 7B.

Referring to FIGS. 7A-7D, the filter lock insert 70 has an annular body 71 that includes an outer circumferential surface 72, an inner circumferential surface 73, a top surface 77, and a bottom surface 79. The filter lock insert 70 defines an opening 89. A circular flange 75 extends about the outer circumferential surface 72 of the annular body 71 at a lower end 74 thereof. The inner circumferential surface 73 of the body 71 is provided with one or more coupling members, which can be a male or female component of a bayonet coupling arrangement. Two coupling members are depicted in the embodiment illustrated in FIGS. 7A, 7C, and 7D, where each coupling member is the female component of the bayonet coupling arrangement comprising a groove 76 formed in the inner circumferential surface 73 of the annular body 71 between the top and bottom surfaces 77, 79 thereof, which extends about 90 degrees. An opening 78 can be provided in the top surface 77 of the annular body 71 at the trailing end of each groove 76 to allow insertion of the corresponding male coupling member component of the bayonet coupling arrangement (e.g., lug 55 of the inner filter element 40 illustrated in FIG. 9D). When two grooves 76 are used, they may be disposed opposite one another, as shown in FIGS. 7A and 7C.

In other embodiments, the one or more coupling members provided on or in the inner circumferential surface 73 of the annular body 71 of the filter lock insert 70 can each include the male coupling member component of the bayonet coupling arrangement instead of the female component. In such embodiments, each male coupling member component can comprise a lug similar to the lug 55 illustrated in FIG. 9D. In still other embodiments, each coupling member provided on or in the inner circumferential surface 73 of the annular body 71 of the lock insert 70 can comprise a thread segment or a continuous thread or groove extending less than, equal to, or more than 360 degrees (not shown).

Referring again to FIG. 4A, the insert retaining collar 80 surrounds the central opening 23 of the upper end cap 21. The insert retaining collar 80 includes an annular wall 82 extending up from the top surface 22 of the upper end cap 21 and a circular retaining flange 86 at an upper end 84 of the annular wall 82. A recessed ring-shape seating surface 24 is provided in the portion of the top surface 22 of the upper end cap 21 located between the central opening 23 and the annular wall 82. The seating surface 24 receives the annular portion 62 of the filter washer 60. The circular retaining flange 86 of the insert retaining collar 80 and the annular portion 62 of the filter washer 60 define a space therebetween (not visible) for receiving the flange 75 of the lock insert 70.

Figure 2C:
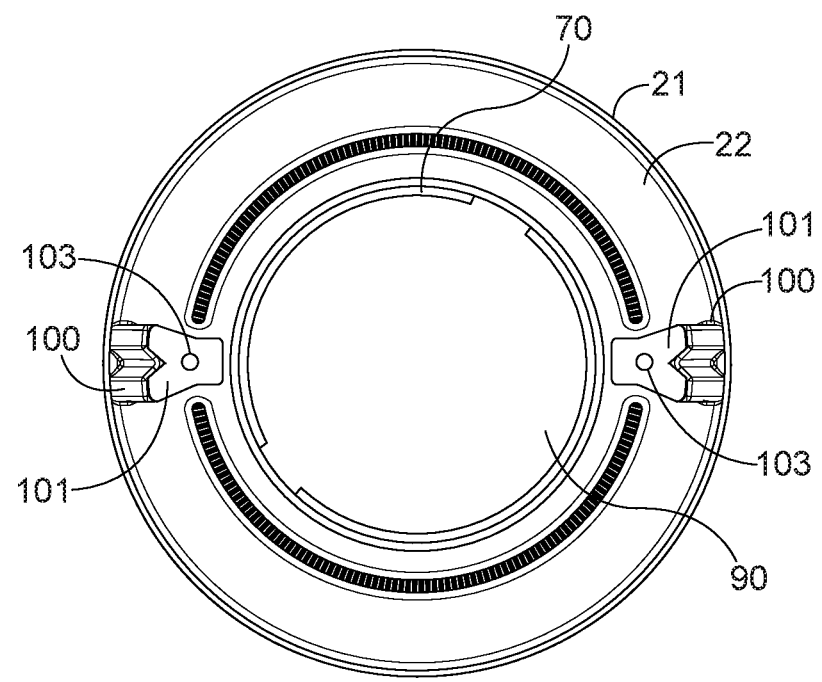
FIG. 2C is a top plan view of the filter assembly with the inner filter element removed from the outer filter element.
Figure 2D:
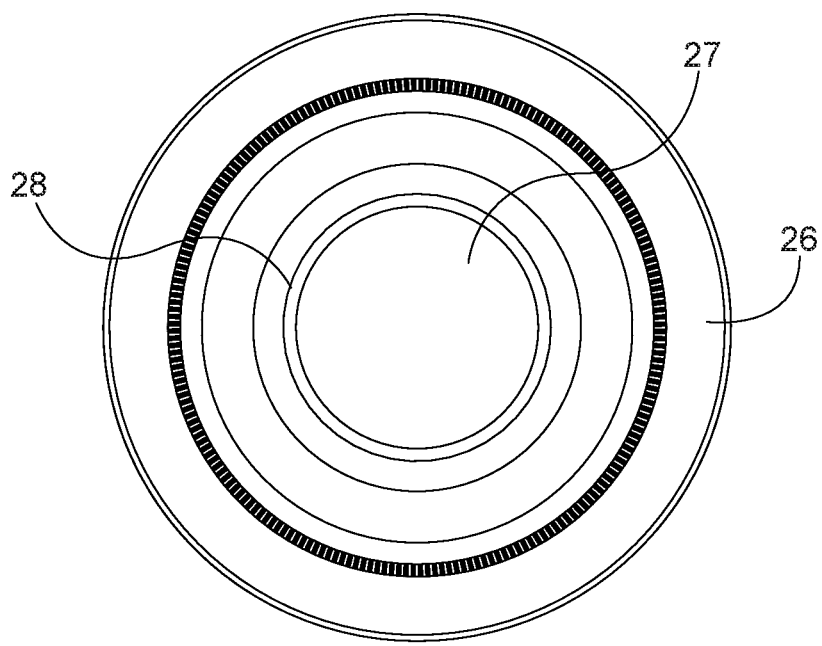
FIG. 2D is a bottom plan view of the outer filter element.

Referring again to FIGS. 2C, 3A, and 4A, the opening 23 of the upper end cap 21, the opening 89 of the lock insert 70, and the opening 66 of the filter washer 60, are coaxially aligned to define an aperture 90, which permits the inner filter element 40 to be inserted through the upper cap 21 and installed within the interior space 38 of the outer filter element's porous filter membrane 32. When installed within the interior space 38, the filter medium 46 of the inner filter element 40 can filter and treat fluid that has passed through and been first filtered by the porous filter membrane 32.

Figure 9A:
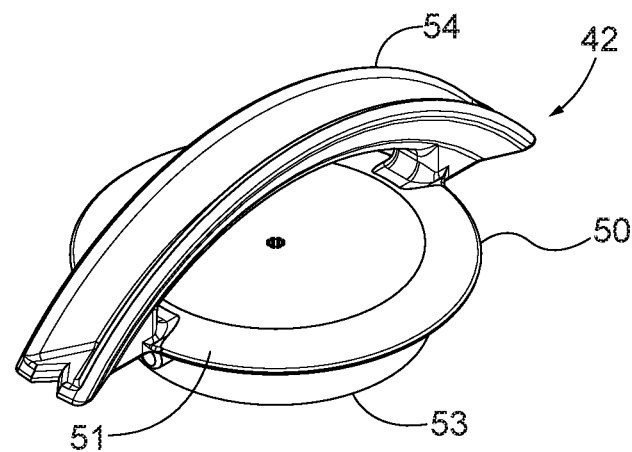
FIG. 9A is a top isometric view of an embodiment of a handle structure of the inner filter element according to an embodiment of the invention.
Figure 9B:
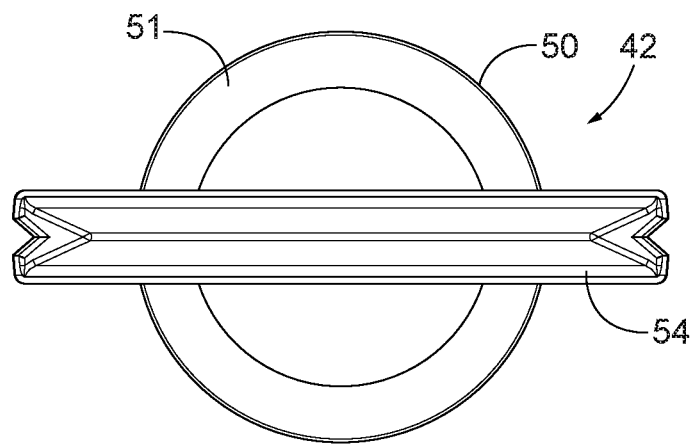
FIG. 9B is a top plan view of the handle structure.

Referring now to FIGS. 1C, 2D, and 5A-5E, the lower end cap 26 of the outer filter element 30 has a central opening 27 that allows fluid communication with the interior space 38 (FIG. 3A) defined by the outer filter element's porous filter membrane 32, and a connector 28 non-removably disposed within the central opening 27 for removably mounting the filter assembly 20 to a filter system (not shown) of a spa, a swimming pool, or the like. The connector 28 can comprise an externally threaded collar as shown, or an internally threaded collar (not shown). In other embodiments, the lower end cap 26 can comprise an internally threaded collar 280 (FIGS. 9A and 9B) or an externally threaded collar (not shown) that is unitarily formed with the lower end cap 26 and surrounds the opening 27 in the end cap 26 of the outer filter element 30, and is operative as a connector.

Figure 8A:
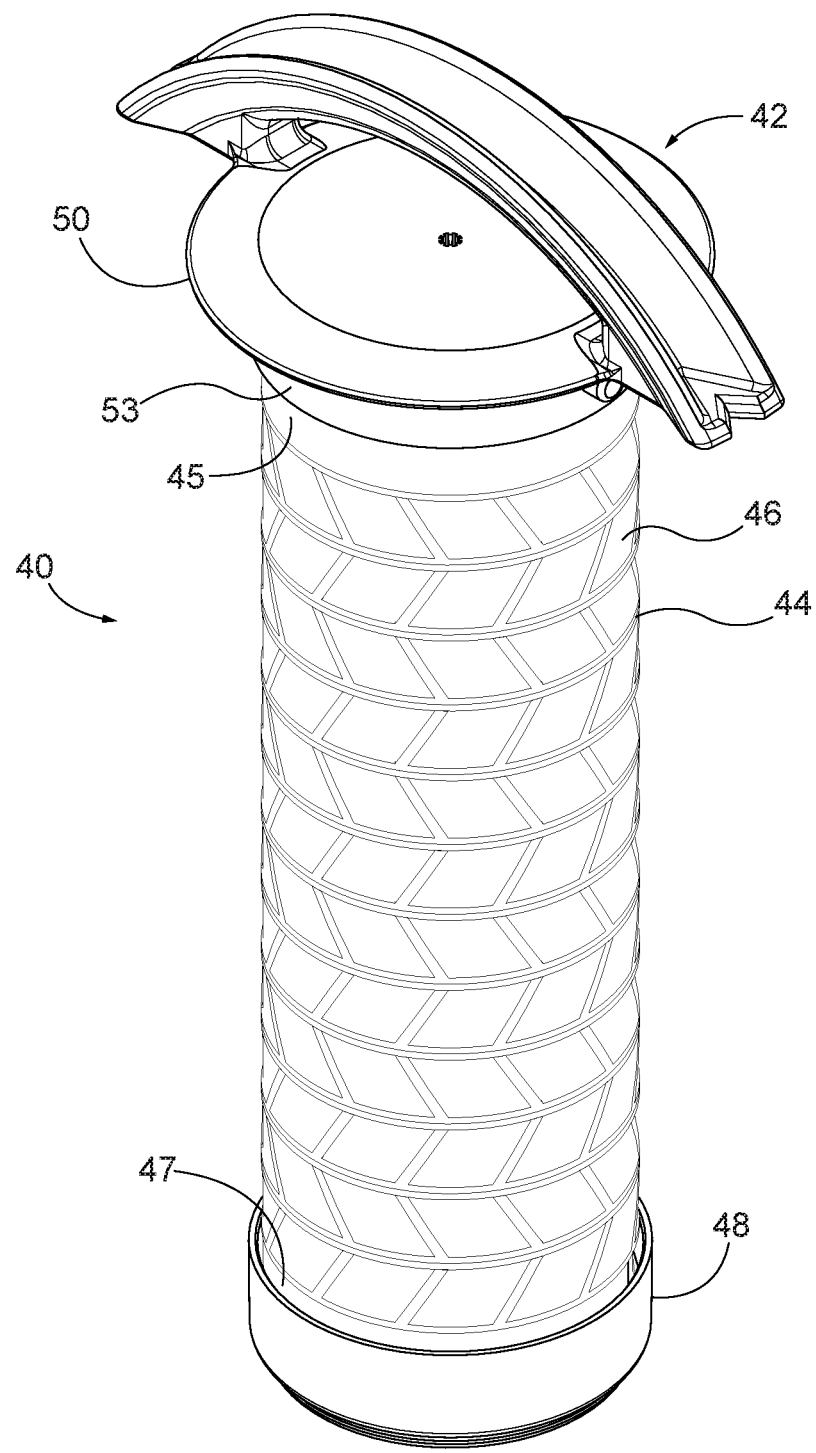
FIG. 8A is a top isometric view of the inner filter element of the filter assembly according to an embodiment of the invention.
Figure 8B:
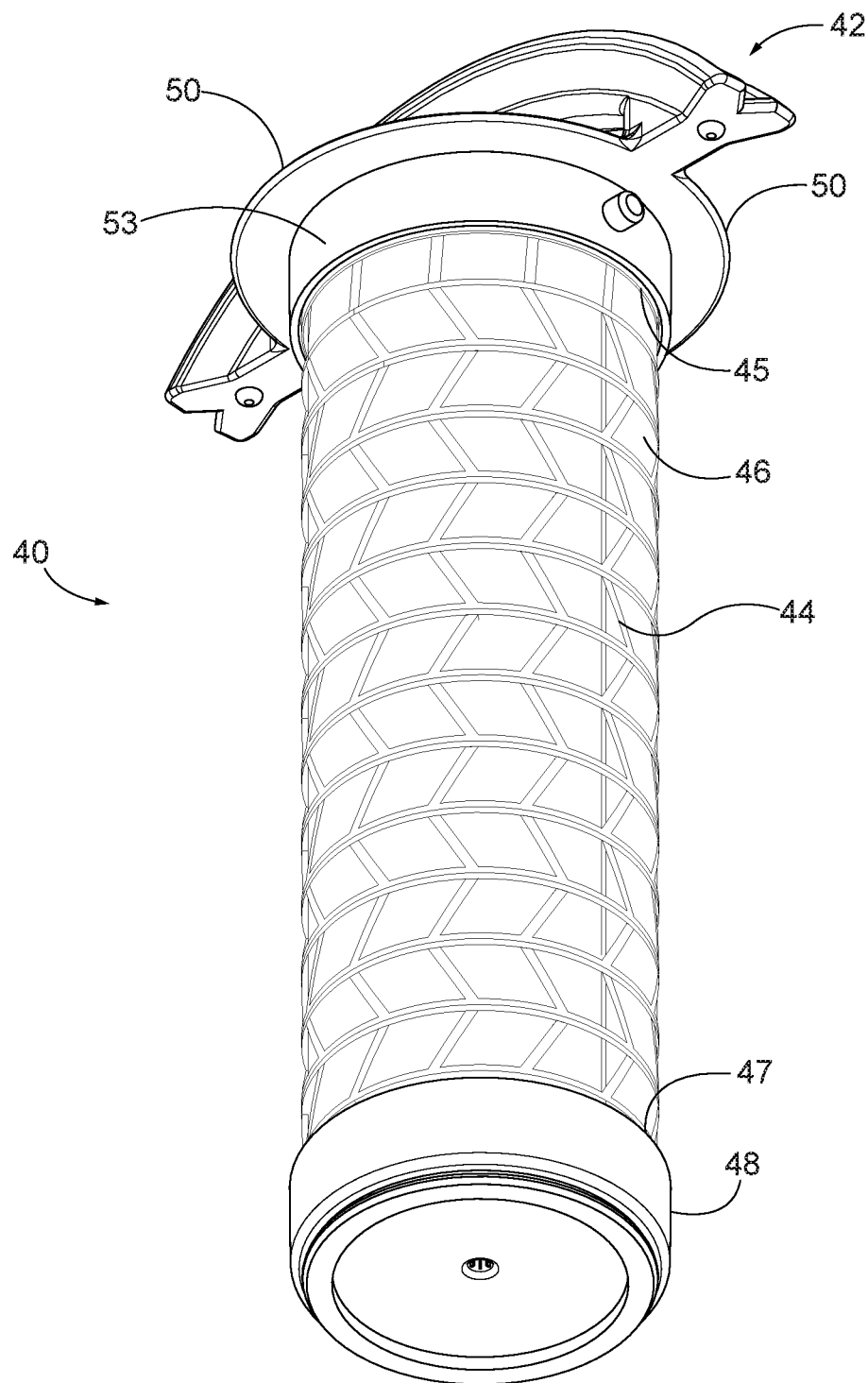
FIG. 8B is a bottom isometric view of the inner filter element.
Figure 8C:
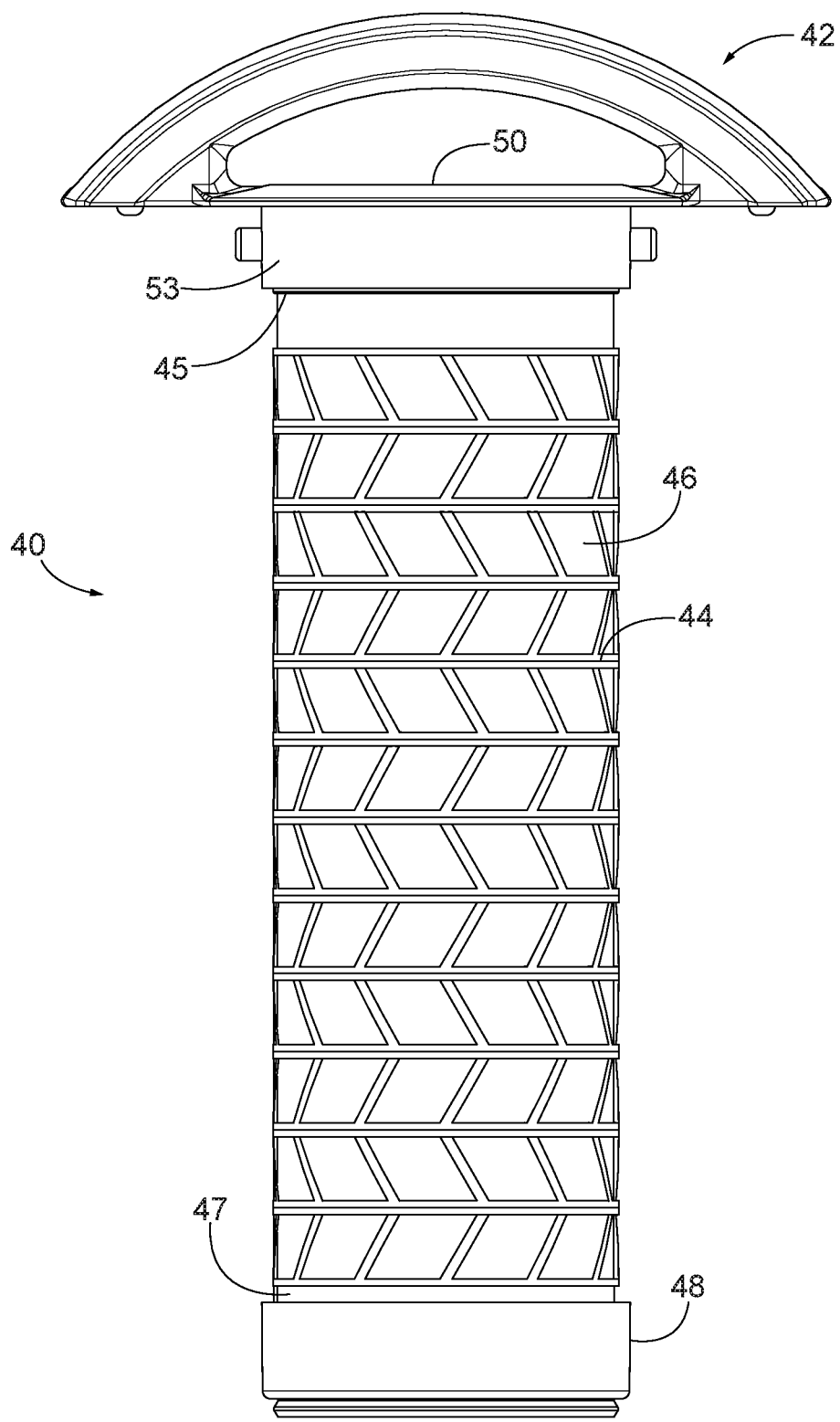
FIG. 8C is a front or rear elevational view of the inner filter element.
Figure 8D:
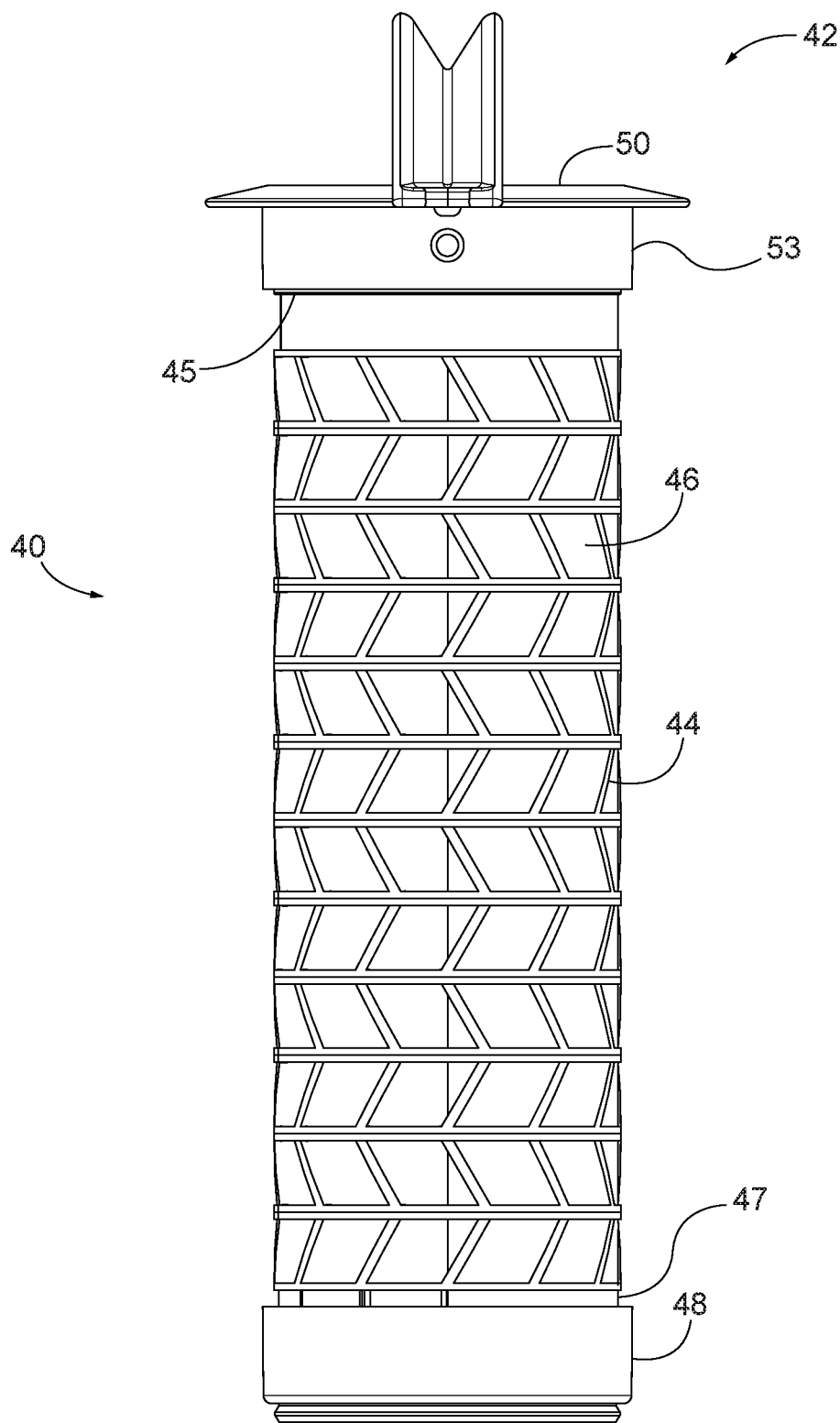
FIG. 8D is a left or right elevational view of the inner filter element.

Referring now to FIGS. 8A-8C, the inner filter element 40 comprises a handle structure 42, a perforated support tube or core 44 extending from the lower end of the handle structure 42, a bottom end cap 48 that closes and seals the open lower end of the core 44, and a porous filter medium 46 disposed within the core 44, and extending between the lower end of the handle structure 42 and the bottom end cap 48.

Figure 9C:
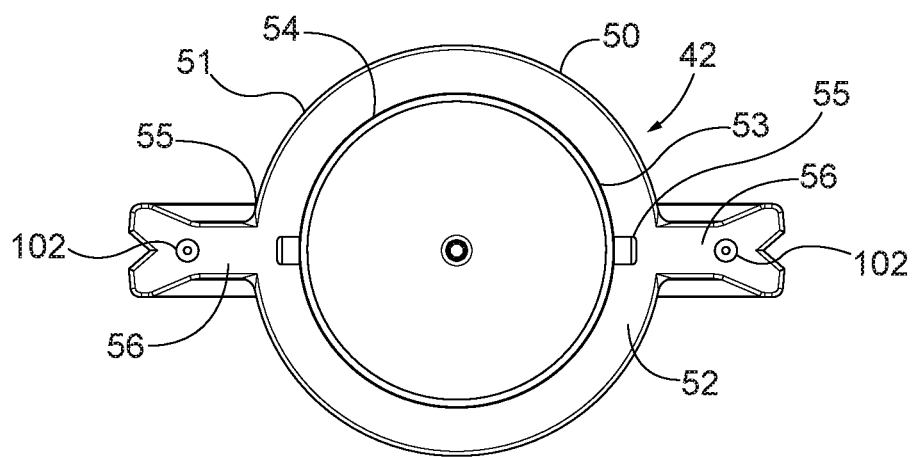
FIG. 9C is a bottom plan view of the handle structure.
Figure 9D:
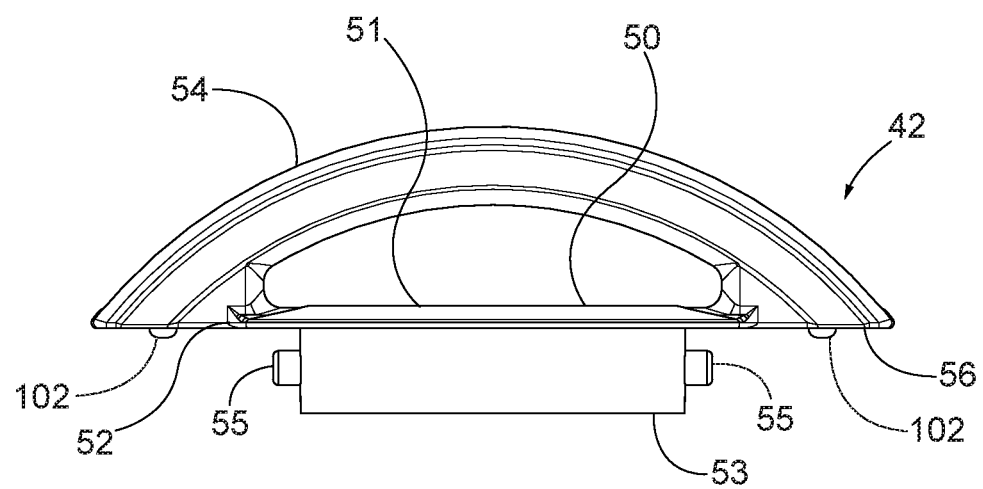
FIG. 9D is a front or rear elevational view of the handle structure.

Referring to FIG. 9A-9E, the handle structure 42 includes a closure member 50 and a handle member 54, which can be unitarily formed with the closure member 50. The closure member 50 includes a circular top wall 51 and an annular skirt 53 depending from the bottom of the top wall 51. The outer circumferential surface 57 of the annular skirt 53 has one or more coupling members 55 which is/are configured to engage the coupling member(s) 76 of the outer filter element 30 (FIG. 7A), to connect the inner filter element 40 with the outer filter element 30. Each coupling member can be the corresponding male or female component of the earlier mentioned bayonet coupling arrangement associated with the outer filter element 30. Two male coupling members of the earlier mentioned bayonet coupling arrangement are depicted in the embodiment illustrated in FIGS. 9C-9E, where each coupling member comprises a lug 55 provided on the outer circumferential surface 57 of the annular skirt 53 of the handle structure closure member 50. The lugs 55 threadedly engage the groove segments 76 formed in the inner circumferential surface 73 of the annular body 71 of the outer filter element lock insert 70. When two lugs 55 are used, they may be disposed on opposite sides of the annular skirt 53, as illustrated in FIGS. 9C and 9D.

In other embodiments, the one or more coupling members provided on or in the outer circumferential surface 57 of the annular skirt 53 of the handle structure closure member 50 can each include the female coupling member component of the bayonet coupling arrangement instead of the male component (when the outer filter element 30 includes the male component). In such embodiments, each female coupling member component can comprise a groove similar to the groove 76 shown in FIG. 7A. In still other embodiments, each coupling member provided on or in the outer circumferential surface 57 of the annular skirt 53 of the handle structure closure member 50 can comprise a thread segment or a continuous thread or groove extending less than, equal to, or more than 360 degrees (not shown).

Referring again to FIG. 9D, the circular top wall 51 of the handle structure closure member 50 may have an outer diameter which is slightly larger than the outer diameter of the annular skirt 53. This allows an overhanging portion 52 of the circular top wall 51 to cover and engage the top surface 77 of the filter lock insert 70 when the inner filter element 40 is coupled to the outer filter element 30, as illustrated in FIG. 2A. This arrangement prevents unfiltered fluid from entering the interior space 38 of the outer filter element porous filter membrane 32 through the aperture 90 defined by upper end cap opening 23, the filter lock insert 70 and filter washer 60, which unfiltered fluid could clog the porous filter medium 46 of the inner filter 40.

Figure 9E:
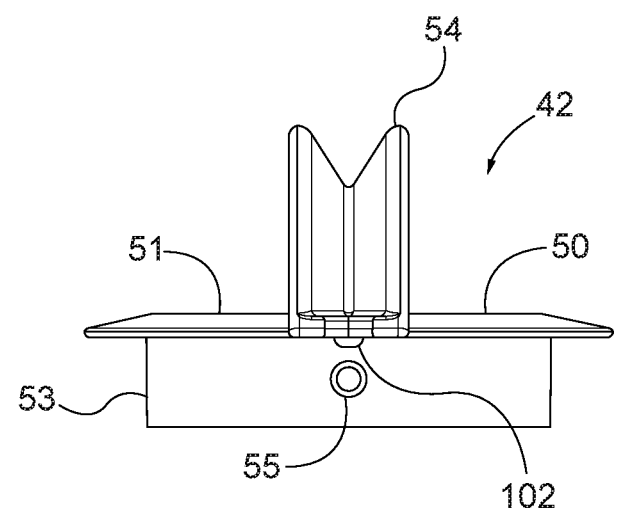
FIG. 9E is a left or right elevational view of the handle structure.
Figure 10A:
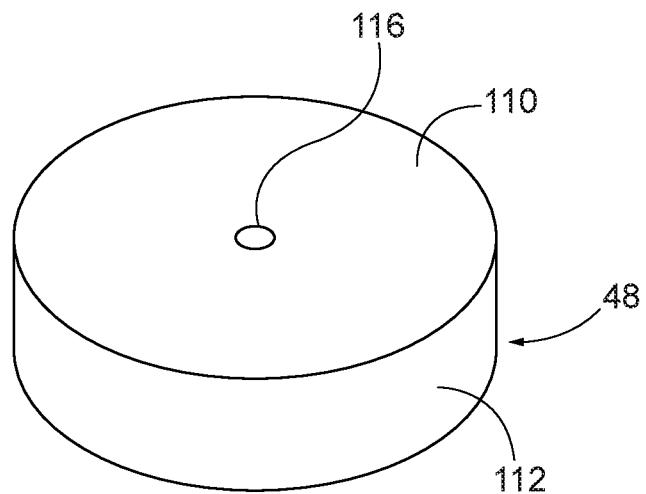
FIG. 10A is a top isometric view of a bottom end cap of the inner filter element according to an embodiment of the invention.
Figure 10B:
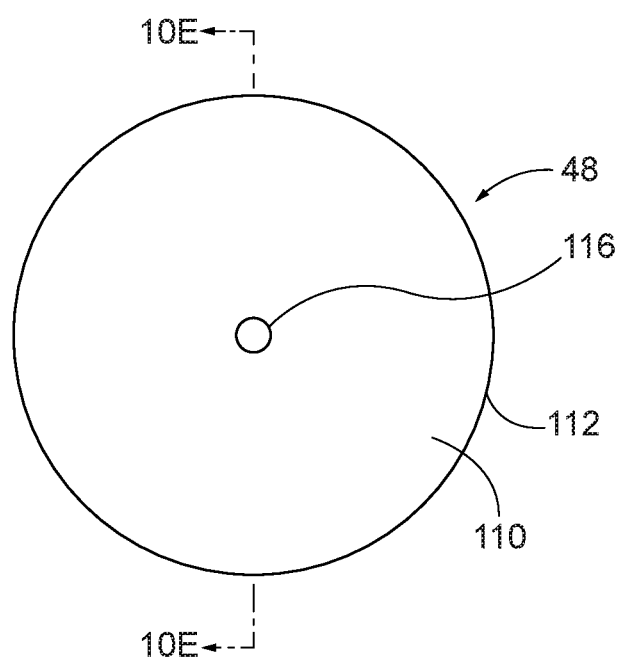
FIG. 10B is a top plan view of the bottom end cap.
Figure 10C:
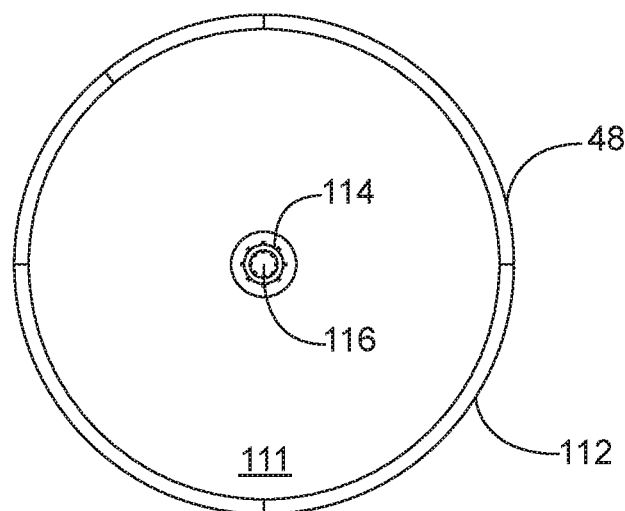
FIG. 10C is a bottom plan view of the bottom end cap.
Figure 10D:
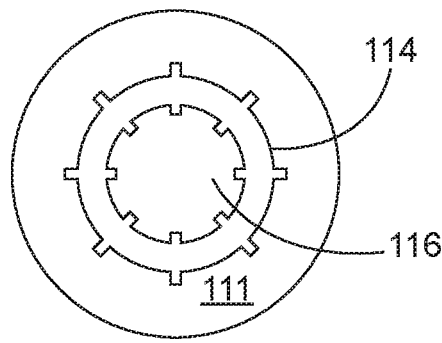
FIG. 10D is an enlarged view of a central portion of the bottom end cap shown in FIG. 10C.
Figure 10E:
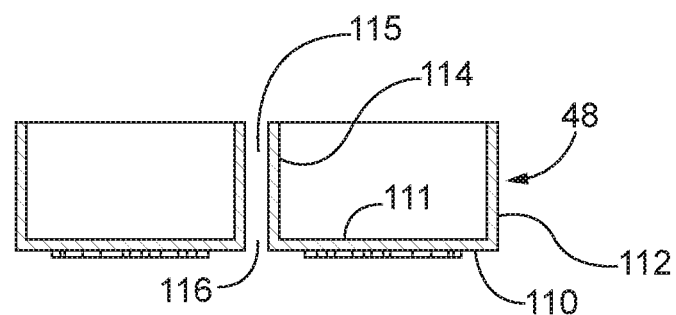
FIG. 10E is an elevational cross-sectional view through line 10E-10E of FIG. 10B.
Figure 11A:
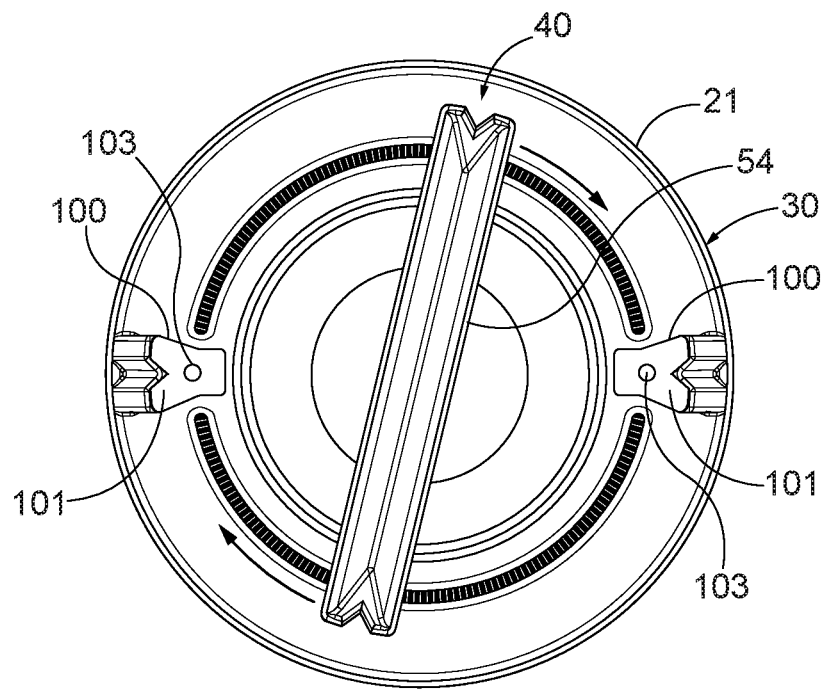
FIGS. 11A and 11B are top plan views of the filter assembly depicting the operation of coupling and detent arrangements of the filter assembly.
Figure 11B:
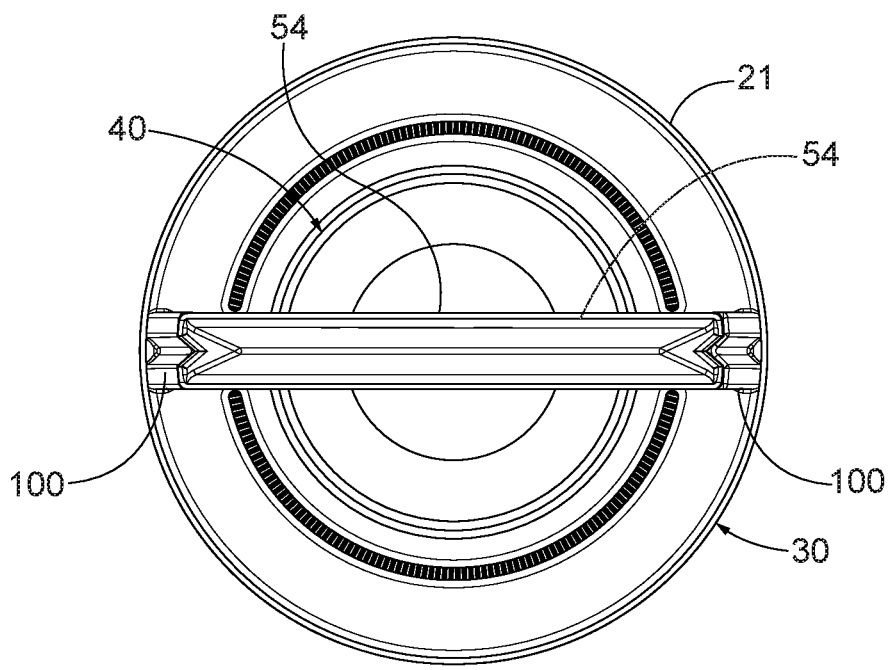

Referring still to FIGS. 9D and 9E, the handle member 54 extends over the closure member 50 and defines opposing first and second abutment end surfaces 56 which merge with the bottom surface of the overhanging portion 52 of the circular top wall 51. The first and second abutment end surfaces 56 overlie and can engage corresponding ones of the pedestals 100 provided on the top surface 22 of the upper end cap 21 when the inner filter 40 is assembled with the outer filter 30, as illustrated in FIGS. 11A and 11B. Detent locking members or elements 102 (illustrated as bumps in FIGS. 9D and 9E) of the earlier mentioned detent arrangement, are provided on or in one or both of the abutment end surfaces 56 of the handle member 54. The detent arrangement resists relative rotation between the coupled outer and inner filter elements 30, 40 when the detent locking element(s) 103 provided in or on the upper surface(s) 101 of the pedestals 100 of the outer filter element upper end cap 21 (FIG. 2C) engage the detent locking element(s) 102 provided on or in the abutment end surfaces 56 of the inner filter element handle member 54 (FIG. 9D), unless a sufficient amount of rotational torque is applied to the handle member 54 of the inner filter 40, which causes the bump(s) 102 to move out of the indentation(s) 103, thereby preventing the inner filter element 40 from inadvertently uncoupling from the outer filter element 30 when the filter assembly 20 is in use. Accordingly, the coupling arrangement and locking detent arrangement operate together to releasably couple the outer filter element 30 with the inner filter element 40.

Referring to FIGS. 10A-10E, the bottom end cap 48 includes a top wall 110 and a side wall 112 extending from the circumferential edge of the top wall 110. A centrally located tube 114 extends up from an interior surface 111 of the top wall 110. The tube 114 defines a channel 115 that fluidly communicates with an outlet opening 116 in the top wall 110. The channel 115 of the tube 114 and the outlet opening 116 in the top wall 110 allow any air contained inside the filter medium 46 and/or any fluid that passes through the filter medium 46, to exit the inner filter 40 into the interior space 38 of the outer filter element porous filter membrane 32.

Referring again to FIGS. 8A-8D, the core 44 of the inner filter element handle structure 42 has an upper end 45 that is non-removably or removably inserted into or otherwise connected with the annular skirt 53 of the closure member 50 and a lower end 47 is that non-removably or removably inserted into or otherwise connected the bottom end cap 48. The filter medium 46 is disposed in and supported by the core 44. The openings in the core 44 of the inner filter element 40 allow fluid (which has passed through and been filtered by the porous filter membrane 32 of the outer filter 30) flowing through the interior space 38 to contact and flow into and out of the filter medium 46. The filtered fluid then exits the outer filter element 30 through the opening 27 in the connection element 28, and into the filter system (not illustrated).

The filter medium 46 of the inner filter element 40 can be folded, wrapped or rolled into a rod or cylindrical shaped element contained within the core 44. The porous filter medium 46 can be made of a fibrous material, such as layers of woven polyester fibers or non-woven polyester felt laminated together. A particulate fluid purifying medium can be randomly distributed and captured within the filter medium 46. The purifying medium can comprise irregularly shaped particles (not shown) formed of an alloy of copper and zinc as described in U.S. Pat. Nos. 5,135,654; 5,198,118 and 5,314,623, all to Heskett, the disclosures of which are incorporated herein by reference.

In operation, the fluid purifying medium creates an electrochemical reaction in the spa water known as an oxidation-reduction reaction as the water contacts and/or passes through the filter medium 46. The metal alloy comprising the medium exchanges valence electrons with other elements and compounds in the water thereby changing the water chemistry and creating an environment which is deadly to some microorganisms and which interferes with the ability of many microorganisms to reproduce. Thus the oxidation-reduction reactions effected by the medium kill algae, fungi, and bacteria. The reactions also remove undesired compounds such as calcium carbonate and hydrogen sulfide from the water. The medium helps stabilize the pH of the water and removes heavy metals such as copper, lead and mercury, which tend to plate onto the surface of the medium. Free chlorine is converted into a water-soluble chloride, thereby providing safe, odor-free water in a spa or pool.

Referring again to FIGS. 3A, 3B, 4A, and 9D, the inner filter element 40 can be installed in the outer filter element 30 by inserting the core 44 of the inner filter element 40 containing the porous filter medium 46 through the aperture 90 defined by the lock insert 70 and filter washer 60 of the outer filter element upper end cap 21. Next, the coupling members of the inner filter element 40 are engaged with the coupling members of the outer filter element 30. In embodiments where the coupling members of the inner filter element 40 are the earlier described lugs 55 and the coupling members of the outer filter element 30 are the earlier described groove segments 76, coupling is achieved by aligning and inserting the lugs 55 of the inner filter element handle structure 42 into the groove segments 76 through the openings 78 in the top surface 77 of the outer filter element lock insert at the trailing end of each groove 76. Then, as illustrated in FIGS. 11A and 11B, the inner filter element 40 is rotated (e.g., clockwise) relative to the outer filter element 30 using the handle member 54 thereby causing the lugs 55 to travel toward the leading end of the grooves 76. As the lugs 55 approach the leading end of the grooves 76 near the end of the rotation, the first and second abutment end surfaces 56 of the handle member 54 slide over the upper surfaces 101 of the pedestals 100 of the upper end cap 21 such that the detent locking elements 102 and 103 lockingly engage one another. This process is reversed when uncoupling and removing the inner filter element 40 from the outer filter element 30. In some embodiments the amount of rotation required to couple/engage or uncouple/disengage the coupling members to install or remove the inner filter 40, is about 90 degrees.

The coupling and detent arrangements of the outer and inner filter elements of the filter assembly and the connector of the lower end cap, as described above, allow the inner filter element to be removed from and installed in the outer filter element without having to disconnect the outer filter element from the filter system of the spa, swimming pool, hot tub or whirlpool. This feature makes it very easy and convenient to replace the inner filter element, which typically requires replacement more often than the outer filter element of the filter assembly.

It should be understood that the invention is not limited to the embodiments illustrated and described herein. Rather, the appended claims should be construed broadly to include other variants and embodiments of the invention, which may be made by those skilled in the art without departing from the scope and range of equivalents of the invention. It is indeed intended that the scope of the invention should be determined by proper interpretation and construction of the appended claims and their legal equivalents, as understood by those of skill in the art relying upon the disclosure in this specification and the attached drawings.

What is claimed is:

1. A filter element for a filter assembly, the filter element comprising:
   an end cap having an opening for removably inserting another filter element of the filter assembly within the filter element;
   a coupling member for engaging a corresponding coupling member of the another filter element of the filter assembly, and connecting the filter element with the another filter element when the another filter element is removably installed within the filter element, the coupling member disposed within the opening of the end cap and including one of:
      a continuous thread or a thread segment;
      a continuous groove or a groove segment; and
      a lug; and
      a detent member for resisting disengagement of the coupling member from the corresponding coupling member of the another filter element when the another filter element is installed within the filter element;
   wherein the detent member includes one of an indentation and a bump provided on a pedestal disposed on the end cap of the filter element, the detent member for releasably engaging a corresponding detent member provided on the another filter element, when the another filter element is removably installed within the filter element.

2. The filter element of claim 1, further comprising a filter medium for mechanically removing particulates from a fluid to be treated.

3. The filter element of claim 2, wherein the end cap is an upper end cap and further comprising a lower end cap, the filter medium disposed between the upper and lower end caps.

4. The filter element of claim 1, wherein the opening has a surface which includes the coupling member.

5. The filter element of claim 1, further comprising another end cap having an opening for removably attaching the filter element to a filter system.

6. The filter element of claim 1, further comprising another end cap having an opening and a connector disposed within the opening for removably attaching the filter element to a filter system.

7. A filter element for a filter assembly, the filter element comprising:
- an end cap having an opening for removably inserting another filter element of the filter assembly within the filter element;
- a coupling member for engaging a corresponding coupling member of the another filter element of the filter assembly, and connecting the filter element with the another filter element when the another filter element is removably installed within the filter element, the coupling member disposed within the opening of the end cap and including one of:
  - a continuous thread or a thread segment;
  - a continuous groove or a groove segment; and
  - a lug; and
- a detent member for resisting disengagement of the coupling member from the corresponding coupling member of the another filter element when the another filter element is installed within the filter element;
- wherein the coupling member comprises a filter lock insert having an annular circumferential surface, the filter lock insert including one of:
  - the continuous thread or the thread segment provided on the circumferential surface of the filter lock insert;
  - the continuous groove or the groove segment provided in the circumferential surface of the filter lock insert; and
  - the lug provided on the circumferential surface of the filter lock insert.

8. A filter element for a filter assembly, the filter element comprising:
- a handle structure including a handle member, the handle member including an abutment end surface;
- a coupling member for engaging a corresponding coupling member of another filter element of the filter assembly, and connecting the filter element with the another filter element when the filter element is removably installed within the another filter element, the coupling member including one of:
  - a continuous thread or a thread segment;
  - a continuous groove or a groove segment; and
  - a lug; and
- a detent member for resisting disengagement of the coupling member from the corresponding coupling member of the another filter element when the filter element is installed within the another filter element, the detent member disposed on the abutment end surface of the handle;
- wherein the handle structure further includes a closure member that merges with the abutment end surface of the handle member, the closure member including the coupling member.

9. The filter element of claim 8, wherein the detent member includes one of an indentation and a bump disposed on the abutment end surface of the handle member, the detent member for releasably engaging a corresponding detent member provided on the another filter element, when the filter element is removably installed within the another filter element.

10. The filter element of claim 8, further comprising a filter medium including a fluid purifying particles.

11. The filter element of claim 10, wherein the fluid purifying medium particles are formed of an alloy of copper and zinc.

12. The filter element of claim 8, further comprising a filter medium depending from the handle structure.

13. The filter element of claim 8, wherein the closure member includes a skirt having a circumferential surface, the circumferential surface including the coupling member.

* * * * *